(12) United States Patent
Klatt et al.

(10) Patent No.: US 12,124,795 B2
(45) Date of Patent: Oct. 22, 2024

(54) TECHNIQUES FOR ENHANCING AN ELECTRONIC DOCUMENT WITH AN INTERACTIVE WORKFLOW

(71) Applicant: Klatt Works, Inc., Pleasanton, CA (US)

(72) Inventors: Nathan D. Klatt, Dublin, CA (US); John David Slack, Las Vegas, NV (US); Divya Prasannan, Dublin, CA (US); Vinod Krishnankutty, Dublin, CA (US); Edward F. Riehle, Elk Grove, CA (US); Stefan Buckenmaier, Duebendorf (CH)

(73) Assignee: KLATT WORKS, INC., Pleasanton, CA (US)

( * ) Notice: Subject to any disclaimer, the term of this patent is extended or adjusted under 35 U.S.C. 154(b) by 0 days.

(21) Appl. No.: 18/061,580

(22) Filed: Dec. 5, 2022

(65) Prior Publication Data

US 2023/0237256 A1     Jul. 27, 2023

Related U.S. Application Data

(63) Continuation of application No. 17/534,813, filed on Nov. 24, 2021, now Pat. No. 11,520,980.
(Continued)

(51) Int. Cl.
*G06F 3/0482* (2013.01)
*G02B 27/01* (2006.01)
(Continued)

(52) U.S. Cl.
CPC ....... *G06F 40/186* (2020.01); *G02B 27/0172* (2013.01); *G06F 3/011* (2013.01);
(Continued)

(58) Field of Classification Search
CPC ...... G06F 40/186; G06F 3/011; G06F 3/0482; G06F 3/0484; G02B 27/0172
(Continued)

(56) References Cited

U.S. PATENT DOCUMENTS

| 5,488,508 A | 1/1996 | Haseltine et al. |
| 6,567,079 B1 | 5/2003 | Smailagic et al. |

(Continued)

FOREIGN PATENT DOCUMENTS

| EP | 3173745 A1 | 5/2017 |
| JP | 2002297966 A | 10/2002 |

OTHER PUBLICATIONS

"U.S. Appl. No. 17/105,048, Non Final Office Action mailed Mar. 2, 2021", 19 pgs.
(Continued)

*Primary Examiner* — Shahid K Khan
*Assistant Examiner* — Ahamed I Nazar
(74) *Attorney, Agent, or Firm* — SCHWEGMAN LUNDBERG & WOESSNER, P.A.

(57) ABSTRACT

The present patent application describes techniques for generating an enhanced electronic document that may include one or more graphical user interface (GUI) elements that comprise an interactive workflow. An electronic document is automatically processed to identify patterns within the content of the document that indicate individual content items, such as individual steps or instructions associated with a task described in the document, or individual input fields at which information is to be recorded. For each individual content item identified, a data object (e.g., a JSON object) is added to a file, which is ultimately embedded within the original document to create an enhanced electronic document. When the enhanced electronic document is presented via an appropriate document viewing
(Continued)

application of a hands-free computing device, the content of the document is presented in combination with the interactive GUI elements so the end-user can interact with the content and GUI elements via audible (spoken) commands.

20 Claims, 15 Drawing Sheets

Related U.S. Application Data

(60) Provisional application No. 63/118,471, filed on Nov. 25, 2020.

(51) Int. Cl.
| | |
|---|---|
| *G06F 3/01* | (2006.01) |
| *G06F 3/0484* | (2022.01) |
| *G06F 40/186* | (2020.01) |
| *G06V 30/414* | (2022.01) |
| *G06V 30/422* | (2022.01) |

(52) U.S. Cl.
CPC .......... *G06F 3/0482* (2013.01); *G06F 3/0484* (2013.01); *G06V 30/414* (2022.01); *G06V 30/422* (2022.01); *G02B 2027/0138* (2013.01); *G02B 2027/0141* (2013.01)

(58) Field of Classification Search
CPC .... G02B 2027/0138; G02B 2027/0141; G06V 30/414; G06V 30/422
USPC ............................................................ 704/9
See application file for complete search history.

(56) References Cited

U.S. PATENT DOCUMENTS

| | | | |
|---|---|---|---|
| 6,606,544 | B2 | 8/2003 | Glenn, III et al. |
| 11,151,898 | B1 | 10/2021 | Klatt et al. |
| 11,520,980 | B2 | 12/2022 | Klatt et al. |
| 2002/0155417 | A1 | 10/2002 | Browne et al. |
| 2006/0224948 | A1* | 10/2006 | Desmond .............. G06F 40/174 707/999.107 |
| 2008/0184360 | A1 | 7/2008 | Kornilovsky et al. |
| 2009/0202221 | A1 | 8/2009 | Guo et al. |
| 2012/0075168 | A1 | 3/2012 | Osterhout et al. |
| 2013/0139233 | A1 | 5/2013 | Maity |
| 2014/0316794 | A1 | 10/2014 | Goll et al. |
| 2015/0135309 | A1 | 5/2015 | Karmarkar et al. |
| 2015/0286976 | A1 | 10/2015 | Hirschfeld et al. |
| 2015/0302651 | A1 | 10/2015 | Shpigelman |
| 2015/0370776 | A1 | 12/2015 | New |
| 2016/0019423 | A1 | 1/2016 | Ortiz et al. |
| 2016/0267265 | A1 | 9/2016 | Waltermann et al. |
| 2017/0011254 | A1 | 1/2017 | Guo et al. |
| 2017/0061212 | A1 | 3/2017 | Tanaka et al. |
| 2017/0124070 | A1* | 5/2017 | Rosart .................. G06F 40/263 |
| 2017/0193302 | A1 | 7/2017 | Mullins |
| 2017/0195629 | A1 | 7/2017 | Wexler et al. |
| 2017/0213390 | A1 | 7/2017 | Ramachandran et al. |
| 2018/0114288 | A1* | 4/2018 | Aldaz .................. A61B 5/0002 |
| 2019/0303553 | A1 | 10/2019 | Choiniere et al. |
| 2019/0312985 | A1 | 10/2019 | Yeap et al. |
| 2019/0391642 | A1 | 12/2019 | Eil |
| 2020/0089855 | A1 | 3/2020 | Chou et al. |
| 2020/0122855 | A1 | 4/2020 | Conaway |
| 2020/0137665 | A1 | 4/2020 | Judi et al. |
| 2020/0142388 | A1 | 5/2020 | Maggiore et al. |
| 2020/0298994 | A1 | 9/2020 | Conaway et al. |
| 2020/0346783 | A1 | 11/2020 | Conaway et al. |
| 2021/0327296 | A1 | 10/2021 | Klatt et al. |
| 2022/0091707 | A1* | 3/2022 | Meriaz ................. G06K 7/1417 |
| 2022/0164528 | A1 | 5/2022 | Klatt et al. |
| 2022/0208022 | A1 | 6/2022 | Klatt et al. |

OTHER PUBLICATIONS

"U.S. Appl. No. 17/105,048, Notice of Allowance mailed Jun. 14, 2021", 10 pgs.

"U.S. Appl. No. 17/105,048, Response filed May 28, 2021 to Non Final Office Action mailed Mar. 2, 2021", 15 pgs.

"U.S. Appl. No. 17/448,091, Advisory Action mailed May 3, 2023", 3 pgs.

"U.S. Appl. No. 17/448,091, Advisory Action mailed May 17, 2023", 4 pgs.

"U.S. Appl. No. 17/448,091, Final Office Action mailed Jan. 10, 2023", 25 pgs.

"U.S. Appl. No. 17/448,091, Final Office Action mailed Jan. 31, 2024", 26 pgs.

"U.S. Appl. No. 17/448,091, Non Final Office Action mailed Jun. 29, 2023", 26 pgs.

"U.S. Appl. No. 17/448,091, Non Final Office Action mailed Jul. 8, 2022", 22 pgs.

"U.S. Appl. No. 17/448,091, Preliminary Amendment Filed Nov. 30, 2021", 8 pgs.

"U.S. Appl. No. 17/448,091, Response filed Apr. 10, 2023 to Final Office Action mailed Jan. 10, 2023", 11 pgs.

"U.S. Appl. No. 17/448,091, Response filed Oct. 10, 2022 to Non Final Office Action mailed Jul. 8, 2022", 11 pgs.

"U.S. Appl. No. 17/448,091, Response filed Oct. 30, 2023 to Non Final Office Action mailed Jun. 29, 2023", 22 pgs.

"U.S. Appl. No. 17/534,813, Examiner Interview Summary mailed Jul. 19, 2022", 2 pgs.

"U.S. Appl. No. 17/534,813, Non Final Office Action mailed Apr. 1, 2022", 21 pgs.

"U.S. Appl. No. 17/534,813, Notice of Allowance mailed Aug. 1, 2022", 9 pgs.

"U.S. Appl. No. 17/534,813, PTO Response to Rule 312 Communication mailed Nov. 2, 2022", 2 pgs.

"U.S. Appl. No. 17/534,813, Response filed Jul. 1, 2022 to Non Final Office Action mailed Apr. 1, 2022", 19 pgs.

* cited by examiner

Maintenance Instructions –
Model: XYZ Rev. 1c

CHAPTER 2
CHANGING THE OIL 2-1-1 Changing the oil of the Model XYZ.

1. Confirm the type and amount of oil needed. For the Model XYZ, use synthetic oil only.
2. Prepare the vehicle by turning it off and removing the key from the ignition.
3. Locate and remove the oil plug.
4. Drain the oil.
5. Replace and tighten the oil plug.
6. Replace the existing/old oil filter.
7. Add the new oil.
8. Check the oil level and add more if necessary.

17 of 489

FIG. 2

200

10 Pages

Maintenance Instructions –
Model XYZ Rev. 1c

< 3 >

CHAPTER 2
CHANGING THE OIL 2-1-1 Changing the oil of the Model XYZ.  — 1002

1. Confirm the type and amount of oil needed. For the Model XYZ, use synthetic oil only. ☑

2. Prepare the vehicle by turning it off and removing the key from the ignition. ☑

3. Locate and remove the oil plug. ☑

4. Drain the oil. ☑

5. Replace and tighten the oil plug. ☑

6. Replace the existing/old oil filter. ☑

7. Add the new oil. ☑

8. Check the oil level and add more if necessary. ☑

| TASK | ASSIGNEE | DATE | PRIORITY | START | DUE | MOVE |
|---|---|---|---|---|---|---|
| Task ACME 34 | John Doe | 8/15/2020 | HIGH | 9/11/2020 | 9/15/2020 | |
| ACME Repair | Sally Smith | 7/25/2020 | LOW | 8/1/2020 | 1/1/2021 | PUSH TO TECHNICIAN |
| Task 17 | Fred Flint | 10/31/2020 | HIGH | 11/1/2020 | 11/5/2020 | |
| Task 29 | Jeff Johnson | 12/5/2020 | HIGH | 12/20/2020 | 1/1/2021 | 1402 |

ASSIGN TASK

+ ASSIGN TASK

Remove All

Admin

DASHBOARDS
USERS
DOCUMENTS
  Import
  Manage Workflow
TASK MANAGEMENT
  Assign Task
  Task Flow
  Maintenance Log
TELEPRESENCE
GENERATE CODE

FIG. 14

TECHNIQUES FOR ENHANCING AN ELECTRONIC DOCUMENT WITH AN INTERACTIVE WORKFLOW

RELATED APPLICATIONS

This patent application is a continuation of U.S. patent application Ser. No. 17/534,813, filed Nov. 24, 2021, now issued as U.S. Pat. No. 11,520,980, which claims a priority benefit to U.S. Provisional Patent Application No. 63/118,471, entitled "TECHNIQUES FOR ENHANCING AN ELECTRONIC DOCUMENT WITH AN INTERACTIVE WORKFLOW," filed on Apr. 15, 2020, each of which are incorporated herein by reference in their entirety.

TECHNICAL FIELD

The subject matter of the present patent application relates generally to the technical field of data processing and presentation techniques. More specifically, the subject matter involves techniques for enhancing an electronic document to include information for use in generating a user interface that provides an interactive workflow with, among other things, checklist items that correspond with individual content items within content of the electronic document, such as individual instruction steps for completing a particular task.

BACKGROUND

Wearable computing devices, specifically those with head-mounted displays, are becoming increasingly popular tools for use in a wide variety of applications by maintenance specialists, inspectors, equipment technicians and other service professionals. A wearable computing device with a head-mounted display provides the person wearing the device with the ability to consume information presented via the display without requiring that person to look away from his or her viewpoint. Many such devices include some type of sound sensor (e.g., a microphone) for receiving spoken commands, and are thus generally capable of being operated in a hands-free manner. This allows a person wearing such a device to very quickly toggle his or her mental focus between any information that is being presented via the display, and the actual task that is being performed. The end result is that a person wearing such a device can perform a wide variety of tasks far more efficiently than could be performed if the person performing the task must manually operate a conventional mobile computing device, such as a laptop computer.

BRIEF DESCRIPTION OF THE DRAWINGS

Some embodiments of the present invention are illustrated by way of example and not limitation in the figures of the accompanying drawings, in which like reference numbers indicate similar elements, and in which:

FIG. 2 is a diagram illustrating an example of how content in an original electronic document may be presented, prior to the document being enhanced with an interactive workflow, consistent with embodiments of the present invention;

FIG. 10 is a diagram illustrating an example of a user interface showing a view of an electronic document that has been processed to automatically identify individual content items within the electronic document that correspond with individual instructions for performing a task, according to some embodiments of the invention;

FIGS. 13 and 14 are diagrams illustrating examples of user interfaces for a task management service that is part of a work management portal, such that the task management services allows one to create, assign and communicate tasks to service professionals, according to some embodiments of the present invention.

DETAILED DESCRIPTION

Figure 1A:
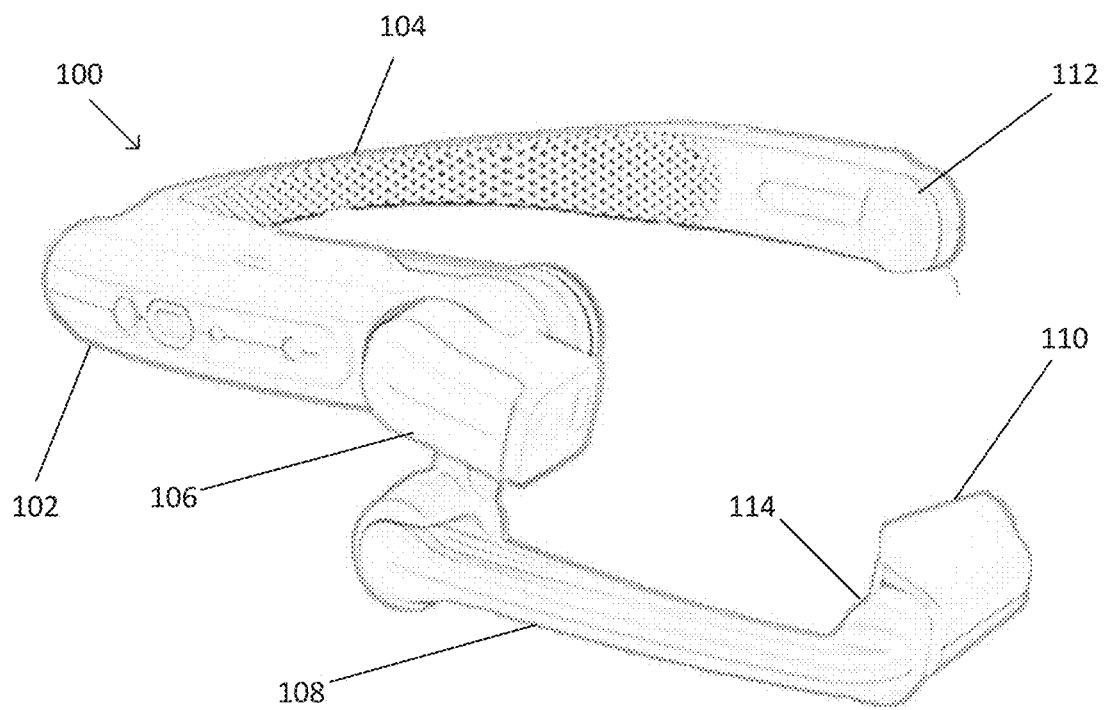
FIGS. 1A and 1B are diagrams illustrating two examples of hands-free computing devices, specifically, head-worn computing devices, each having a head-mounted display for presenting enhanced documents and receiving hands-free input, consistent with embodiments of the present invention.

Described herein are methods and systems for processing an electronic document for the purpose of enhancing the electronic document with an interactive workflow comprised of a variety of graphical user interface (GUI) elements representing individual checklist items that generally correspond with original content (e.g., instructions/steps/figures/input fields) included within the electronic document. By enhancing the original electronic document with an interactive workflow, the enhanced electronic document can be presented to a person operating a hands-free computing device, thereby enabling the person to view the enhanced electronic document while interacting with the workflow via audible (e.g., spoken) commands. In the following description, for purposes of explanation, numerous specific details and features are set forth in order to provide a thorough understanding of the various aspects of different embodiments of the present invention. It will be evident, however, to one skilled in the art, that the present invention may be practiced with varying combinations of the many details and features described herein.

In order for a maintenance specialist, inspector, equipment technician or any other service professional to take full advantage of the capabilities of a hands-free computing device in the performance of a particular task, useful content specific to the particular task must be generated for presentation via the display of the hands-free computing device. Generating original content in a format compatible for presentation via a head-mounted display that is specific to a particular task—whether it be a task related to equipment maintenance or repair, a home inspection, or any other task—can be very time consuming and expensive. This is particularly the case when the original content to be generated is also to be presented in an interactive manner, for example, enabling the user to input information, navigate to view additional information, and so forth. Generating highly interactive content typically involves some level of computer programming and/or software development skills. Furthermore, when an organization has already expended significant resources to establish an existing library of documentation (e.g., maintenance, service and repair manuals, inspection checklists, etc.), generating new content for a hands-free computing device will tend to require duplicating efforts and ultimately result in content that is different from any existing content, and thus unfamiliar to the well-trained service professional.

Embodiments of the present invention, as described herein, offer a far more efficient, cost effective and flexible approach and technique. Consistent with various embodiments of the present invention, an organization having an existing library of original electronic documents can continue to use the original electronic documents by enhancing the original documents to include interactive workflows. Consistent with some embodiments, these workflows are implemented by generating a series of data objects that are stored within a separate file, which is then embedded within the original electronic document to create what is referred to herein as an enhanced electronic document. When the enhanced electronic document is presented using an appropriate document viewing application via a hands-free computing device, the content of the original document is displayed along with interactive GUI elements that are rendered based on the information included in the various data objects noted in the file that has been embedded within the electronic document.

Consistent with some embodiments, the interactive workflows that are embedded within the original electronic document are, at least initially, automatically generated by processing an original electronic document with a document processing engine. The processing of the electronic document involves analyzing the content (e.g., the text, figures and white space) of the electronic document to recognize patterns that correspond with structural elements of the document, thereby identifying individual content items within the original electronic document that correspond with the text and figures of individual steps or instructions for performing some task to which the electronic document pertains. For each individual content item representing an individual step or instruction that is identified within the original electronic document, a data object (e.g., a JSON or JavaScript Object Notation object) is generated to correspond with the individual content item, and then the data object is added to a separate file. Accordingly, the result of processing the original electronic document is a separate file, distinct from the original electronic document, which is then embedded within the original electronic document to create an enhanced electronic document. The data objects that correspond with each of the identified individual content items (e.g., an instruction or step for performing a portion of some task) include information about a particular type of GUI element or elements that are to be rendered, along with their respective position (or positions) within the document, when the document is presented via a document viewing application of a hands-free computing device. When an appropriate document viewing application is used to display the enhanced electronic document, the document viewing application will read and process the various data objects to generate appropriate GUI elements (e.g., individual, interactive checklist items) that correspond with the specific content items of the original electronic document, such as the individual instructions or steps for performing a portion of some task.

This approach has a variety of advantages over conventional approaches, which tend to involve generating original, custom content. First, by leveraging an organization's existing library of electronic documents, little to no training or re-training of service professionals is necessary as the organization's service professionals are already familiar with the content of the library of original electronic documents. Second, because an individual workflow for an electronic document is generated separately, for example, as a stand-alone file that is ultimately embedded within the original electronic document, the original electronic document is not modified and can be used with or without the interactive workflows. Moreover, an organization can have separate workflows for the exact same original electronic document, including separate workflows for separate portions of the original electronic document. For example, a lengthy electronic document having multiple chapters or sections may have a separate workflow for each chapter or section. Additionally, separate workflows for the same electronic document may be created in different languages or reference different resources and have different GUI elements based on the skill and experience level of various service professionals. If an original electronic document is updated, for example, as a result of a change to some instructions or procedures described in the electronic document, a workflow associated with the electronic document can simply be copied, edited to coincide with whatever changes have been made to the original electronic document, and then embedded within the updated electronic document. Finally, as described in more detail below, an initial workflow for a particular original electronic document can be generated either manually, using a document authoring tool, or, automatically via an automated document processing engine. Using the automated document processing engine, an entire library of electronic documents can be very rapidly enhanced with interactive workflows, avoiding the inevitable cost and time delays that would result from manually generating original, custom content. Other aspects of the present inventive subject matter are described below in connection with the description of the various figures.

Figure 1B:

FIGS. 1A and 1B illustrate two examples of head-worn computing devices having head-mounted displays for presenting enhanced electronic documents and receiving hands-free input from an end-user to navigate such documents, consistent with embodiments of the present invention. The head-worn computing device 100 of FIG. 1A includes a computer housing 102 that is part of a head support arm 104. When wearing the device 100, the head support arm 104 wraps around the back portion of a person's head at or just above the ears. At one end of the head support arm 104 is an image sensor 106 capable of capturing still photographs as well as video. A display 110 and sound sensor (e.g., a microphone) 114 are mounted on a display boom 108 that extends from the head support arm 104. In this example, the display 110 is mounted forward from where a person's right eye would be when wearing the device 100. The head-worn computing device 100 additionally includes a speaker 112. Although not shown in FIG. 1A, the head-worn computing device 100 includes a rechargeable battery to provide for mobility. In addition, the head-worn computing device of FIG. 1A may include one or more end-user controls (e.g., buttons, switches, dials, touch pads, and/or joysticks) providing the wearer with control over various features and functions. For example, such controls may enable powering the device on/off, manipulating aspects of the user interface presented via the display, adjusting volume levels, adjusting the brightness of the display, and so forth.

The head-worn computing device 100 of FIG. 1A is just one example of a particular form factor of a device via which an enhanced electronic document may be presented, consistent with embodiments of the invention. However, the present invention is by no means limited to any one particular form factor. FIG. 1B illustrates a head-worn computing device 120 having a form factor similar to conventional eyeglasses, sometimes referred to as smart glasses. Although not shown, with some embodiments, a head-mounted display may be combined with a head-worn computing device having a form factor consistent with a protective helmet. Of course, other form factors are possible and entirely consistent with embodiments of the invention as described herein. In various embodiments, the head-mounted display may have varying positions relative to the wearer's eye or eyes. For example, with some embodiments, the display may be mounted forward of the right eye, while in other embodiments, the display may be mounted forward of the left eye. Similarly, with some embodiments, the display may be mounted slightly underneath, above, or to one side of a particular eye. Consistent with some embodiments, the computing device may not be a body-worn computing device, but a mobile computing device such as a mobile phone or tablet computing device. With such devices, user input may be received via a combination of spoken commands and/or interactions with a touch screen display. Although such devices may generally be operated with touch-based input from an end-user, in certain applications such as those described herein, such devices may be operated in a completely hands-free manner with audible (e.g., spoken) commands, providing all of the advantages of the inventive subject matter described herein.

Referring again to the head-worn computing device in FIG. 1A, the display 110 presents various user interfaces to the service professional wearing the device. To navigate the various user interfaces, a service professional uses a combination of audible or spoken commands (received via the sounds sensor 114) and/or head or eye movements. For instance, with some embodiments, the device may utilize a technique that is commonly referred to as head tracking. Head tracking is a technique that utilizes a variety of sensors (e.g., accelerometer, gyroscope, and/or compass) for determining, monitoring and tracking the position and orientation of an end-user's head. With head tracking, the person wearing the device can make subtle movements with his or her head to manipulate the user interface shown on the head-mounted display 110, for the purpose of selecting objects presented via the user interface. Alternatively, with some embodiments, other sensors (e.g., infrared sensors) may be utilized to perform eye tracking. With eye tracking, an end-user can manipulate the user interface to select objects by simply looking at the objects that are presented on the display.

In the many examples provided herein, an enhanced electronic document is described as advantageously being viewed on a head-worn computing device with a head-mounted display. Such a device can be operated in an entirely hands-free way. However, many of the advantages resulting from the various innovative features described herein are also possible when viewing enhanced electronic documents on other computing devices, such as tablet computing devices. While tablet computing devices tend to have touchscreen displays and user interfaces that are best manipulated manually with fingers and/or a pencil-like stylus, many such devices are also capable of receiving audible or spoken commands. Accordingly, navigating an interactive workflow of an enhanced electronic document presented on a tablet computing device offers many, but perhaps not all, of the same advantages that are obtained with a head-worn computing device. For purposes of the present application, both should be considered hands-free computing devices.

FIG. 2 is a diagram illustrating an example of how content in an original electronic document may be presented, prior to the document being enhanced with an interactive workflow, consistent with embodiments of the present invention. In this example, a single page 200 of a multi-page, electronic document is presented, showing individual instructions or steps for changing the oil of an engine. As is easily observed, the content of the original electronic document has an easily identifiable structure. For instance, the text of the electronic document clearly indicates that the particular page shown represents the beginning of chapter two, and the page numbering at the bottom of the page indicates that the presented page is page seventeen of four-hundred eighty-nine pages. Furthermore, the individual steps or instructions for performing the task are clearly numbered (e.g., 1., 2., 3., etc.) and terminated with a period ("."). As described below, using a document editing application, one can quickly and easily generate a workflow, with individual steps that are associated with the elements of the document. Additionally, the document structure may be leveraged in automatically processing the electronic document, via a document processing engine, to identify individual content items within the document that correspond with the individual instructions or steps for performing the relevant task (e.g., changing the oil). Consistent with embodiments of the present invention, an original electronic document may be in any of a number of compatible formats, including but by no means limited to: portable document format (PDF), formats consistent with Microsoft Word®, Excel®, or PowerPoint® (e.g., .doc, .docx, .xls, .xlsx., .ppt, or .pptx), and Rich Text Format (RTF).

Figure 3:
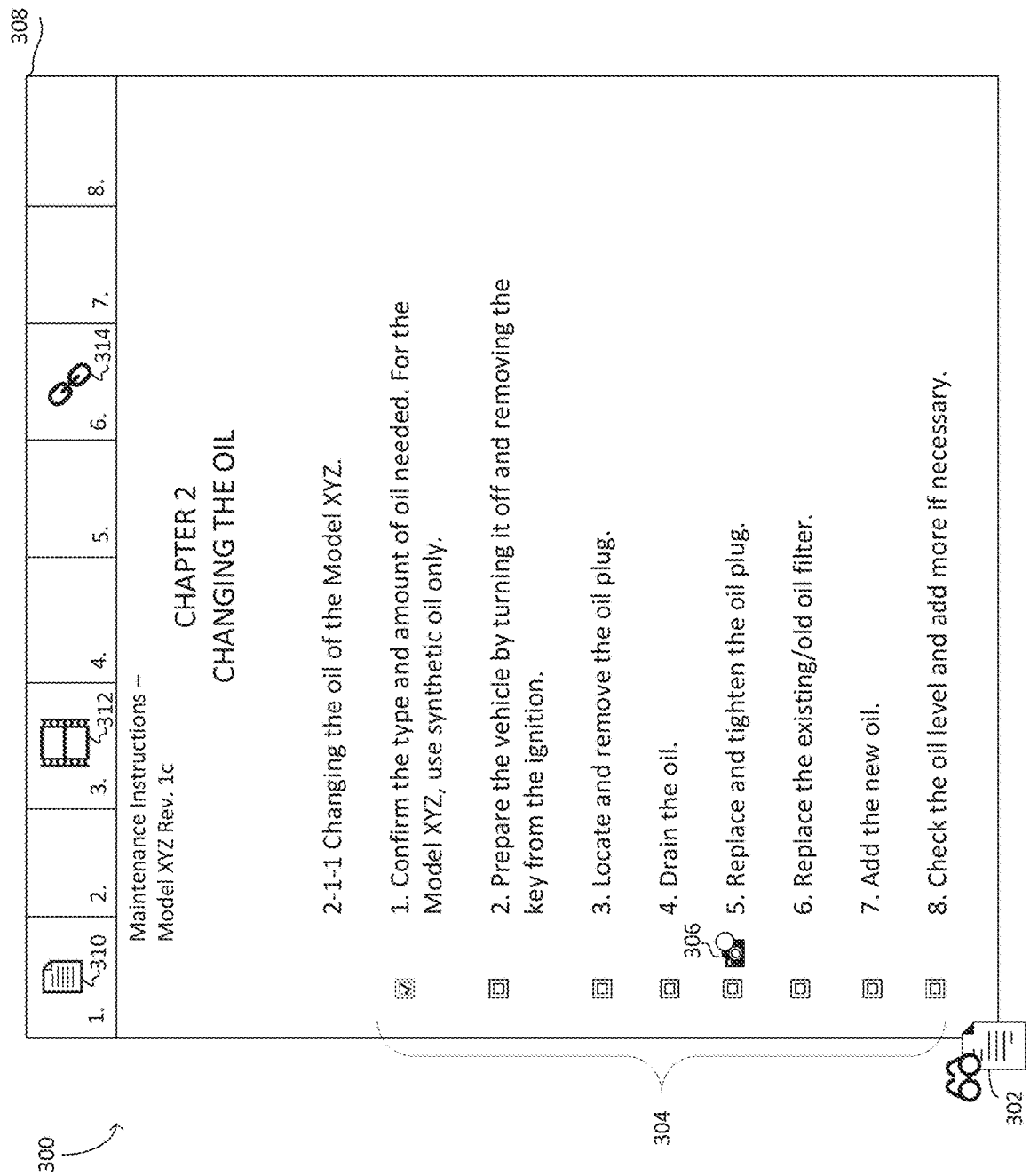
FIG. 3 is a diagram illustrating an example of how content within an enhanced electronic document may be presented in combination with various graphical user interface (GUI) elements that provide an interactive workflow, when rendered by an appropriate document viewing application executing at a hands-free computing device, consistent with some embodiments of the present invention.

FIG. 3 is a diagram illustrating an example display 300 of an electronic document that has been enhanced to include an interactive workflow, consisting of a variety of GUI elements, including a series of interactive checklist items 304 that correspond with the individual instructions or steps set forth in the content of the original electronic document, consistent with some embodiments of the present invention. As described in greater detail below, an original electronic document 200 is enhanced by embedding within the original electronic document a separate file that includes information used to render the interactive workflow that is presented with the original content of the original electronic document. An electronic document that includes an embedded file with information used in rendering the GUI elements of an interactive workflow is referred to herein as an enhanced electronic document 300. In FIG. 3, the symbol with reference number 302 in the lower left corner of the example display of the enhanced electronic document 300 indicates that this view of the enhanced electronic document is consistent with a view of the document as it would be presented via a document viewing application of a hands-free computing device. For example, the illustration presented in FIG. 3 represents what a viewer would see when viewing the enhanced electronic document on a head-mounted display of a wearable computing device, using a document viewing application executing on that device. As shown in this view of the enhanced electronic document, all of the original content of the electronic document is presented, just as it is in the view of the original electronic document 200 shown in FIG. 2. Additionally, a series of interactive checklist items 304 are presented along the left portion of the electronic document, such that, for each individual step or instruction presented as part of the original electronic document, there is one corresponding checklist item shown. The individual checklist items 304 are rendered as part of the presentation of the enhanced electronic document 300 based on information included within a file that has been embedded within the enhanced electronic document 300. In addition to the individual checklist items, the step enumerated as step number five ("5.") includes a separate GUI element in the form of an icon (e.g., an icon depicting a camera) 306. In this instance, the camera icon 306 indicates that, for the specific step enumerated as step number five ("5."), the service professional is required to capture an image to establish evidence that the step was performed properly. This may be achieved, for example, by the service professional issuing a spoken command to invoke an image capturing function of the head-worn computing device while performing the various steps in accordance with the interactive workflow.

In addition to the GUI elements representing the various checklist items 304 and the camera icon 306, the top portion 308 of the presentation of the enhanced electronic document includes a group of enumerated GUI elements, some of which include graphical icons that indicate the availability of one or more additional resources that correspond with or relate to individual steps or instructions in the workflow. By way of example, in the top left portion of the electronic document, an icon in the form of a document 310 is presented in a GUI element enumerated with the number one ("1."). In this instance, the number one ("1.") corresponds with the step or instruction that is also enumerated with a number one ("1."), and the icon indicates the availability of a separate document that is associated with or related to the specific step or instruction. Accordingly, a service professional may issue a spoken command to request that the document be presented via the display of the hands-free computing device in order to get additional information, included within the referenced document, about the enumerated step or instruction. As shown in FIG. 3, the step enumerated as step number three ("3.") also includes an additional resource (e.g., a video file), as indicated by the media icon with reference number 312. Similarly, step number six ("6.") is associated with a link icon 314, indicating the availability of a linked resource, such as a web page.

Consistent with the example as presented in FIG. 3, the document clearly sets forth a series of enumerated steps for performing a task. As such, the workflow includes checklist items that allow the end-user, when performing the actual task, to mark the individual steps as having been completed by interacting with the interface via audible (e.g., spoken) commands. In this example, the checklist item for the instruction step enumerated as number one ("1.") has already been marked as completed, whereas the remaining checklist items are shown as incomplete. In some instances, the individual checklist items that correspond with the separate instruction steps enforce the order in which the steps must be completed. For example, in some instances, a service professional who is performing the task associated with the workflow is required to mark the first checklist item as completed before navigating to the second checklist item, and so forth. When the workflow is originally created, metadata that is associated with each data object representing a GUI element (e.g., a checklist item) of the workflow may control the behavior of the individual GUI elements. Accordingly, while in some instances, the order by which a service professional navigates the checklist items may be enforced, in other instances, the checklist items may be navigated and completed in any order.

In the specific example of FIG. 3, the checklist items 304 appear on the left portion of the displayed electronic document, while the top portion 308 of the user interface presents information relating to additional resources for each of the individual steps. However, it will be readily appreciated that the specific arrangement of the GUI elements that make up the interactive workflow—that is, there position within any particular electronic document—may vary considerably depending upon the content of the document. Furthermore, some of the interactive workflow elements, such as the requirement to capture photographic or video evidence showing the completion of a particular instruction step, may be required or optional. For instance, in the example shown in FIG. 3, the camera icon with reference number 306 indicates that the service professional performing the instruction step enumerated as step number three ("3.") is required to capture photographic evidence of the completion of the step. Such evidence is used when reporting the completion of the task. With some embodiments, a service professional may be able to capture photographic or video evidence showing the completion of any step, regardless of whether it is a required action or step, as indicated by the presence of a particular workflow icon (e.g., the camera icon 306).

Figure 4:
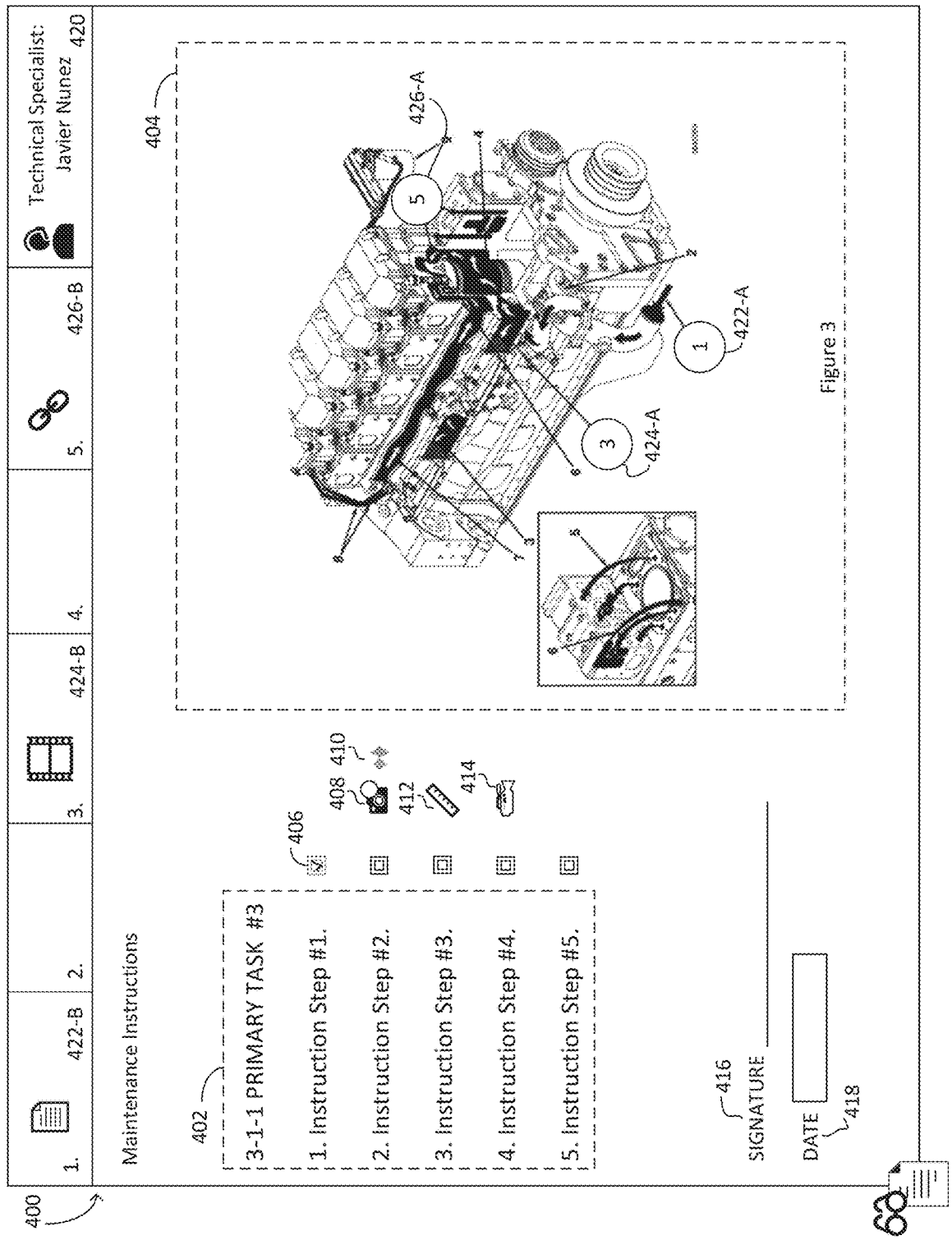
FIG. 4 is a diagram illustrating an additional example of an enhanced electronic document with various graphical user interface (GUI) elements that provide an interactive workflow, consistent with some embodiments of the present invention.

While FIG. 3 illustrates a few of the specific GUI elements that may be added to an electronic document as part of an interactive workflow, many other such interactive GUI elements may be included in a workflow, consistent with various embodiments of the invention. By way of example, FIG. 4 illustrates the presentation of another electronic document that has been enhanced to include an interactive workflow with a variety of interactive GUI elements. The example shown in FIG. 4 is provided primarily to convey an understanding of the various types of interactive GUI elements that may be included in a workflow of an enhanced electronic document. Accordingly, in the example of FIG. 4, the instruction steps 402 are essentially generic in nature, and along with the illustration 404 labeled as FIG. 4, are bounded with a dashed line to indicate that those portions of the content are from the original electronic document. As shown in this example, each of the five instruction steps enumerated as steps one ("1.") through five ("5.") have been enhanced to include an interactive GUI element in the form of a checklist item. For instance, the instruction step enumerated as instruction step number one (1.") is associated with a checklist item with reference number 406, which has been marked as completed.

The instruction step enumerated as number two ("2.") is associated with three distinct GUI elements—a checklist item, a camera icon 408 and a voice memo icon 410. As described in connection with FIG. 3, the camera icon 408 indicates that the instruction step, in order to be marked as completed, requires photographic evidence indicating completion of the step. Accordingly, when a service professional has completed performing some specific task as described by the instruction step enumerated as step two ("2."), the service professional must invoke a camera application on the head-worn computing device in order to capture a photograph that shows the result of performing the instruction step, or the condition of some component or part, and so forth. The voice memo icon 410 associated with the instruction step enumerated as step two ("2.") indicates that a service professional is required to record a voice memo as part of completing the instruction step. For instance, the service professional may be required to annotate the evidence that has been photographically captured with a recorded voice memo. Hence, the service professional will speak an audible command to invoke a voice memo recording application via the head-worn computing device in order to generate a voice memo recording as part of the process of completing the checklist item associated with the second instruction step.

The instruction step enumerated as instruction step number three ("3.") includes two separate workflow GUI elements—a checklist item, and a ruler icon 412. Consistent with some embodiments, a ruler icon 412 indicates a requirement to make a formal observation or measurement of some kind. The measurement or observation may be captured by simply capturing a photograph or video clip that includes a view of a measurement reading using some type of measurement tool, or, a condition, state or measurement reading from a machine or some equipment that is being serviced and/or maintained. For example, the maintenance specialist may use a tool or measuring device (e.g., a pressure gauge, a caliper, a temperature gauge, etc.), and then capture a photograph of the particular measurement reading from the tool or measurement device. Similarly, the machine or equipment being maintained may display some type of measurement reading, such that the measurement reading can be captured in a photograph or video clip by the service professional using the image sensor of the head-worn computing device. Alternatively, the measurement or observation may be made using some variety of digital instrument or hand tool that can convey digital information representing the measurement or reading to the head-worn computing device via a wired or wireless connection. For instance, with some embodiments, a digital tool of some kind may be used to capture a measurement, such that the digital information representing the actual measurement is generated by the tool and automatically communicated from the tool to the head-worn computing device so that it can be recorded in a data field that is associated with the instruction step (e.g., instruction step number three ("3.")). Consistent with some embodiments, one or more tools or measuring devices may be connected via a wired connection, or wirelessly (e.g., via WiFi®) or Bluetooth®) with the head-worn computing device for the purpose of communicating from the tool or measuring device to the head-worn computing device a measurement reading or value. For example, a sensor integrated with the tool or measuring device may generate digital information representing some type of measurement, which is then communicated to the head-worn computing device and stored in a data field in association with a particular checklist item. Examples include but are by no means limited to a wrench that includes a sensor for measuring torque, a pressure gauge, a laser-enabled measurement tool for measuring distance and/or angles, a digital caliper, a voltmeter for measuring voltage, and so forth. With some embodiments, the head-worn computing device may be connected directly (e.g., with a wired or wireless connection) to the machine or equipment that is being serviced or maintained for the purpose of capturing a measurement or receiving some other diagnostic information directly.

The instruction step enumerated as number four ("4") in FIG. 4 includes both a checklist item as well as a video recorder icon 414. Similar to the camera icon 408, the video recorder icon 414 indicates that a video clip or recording is required in order to complete the instruction step. As such, during or immediately after performing the instructions described by instruction step number three ("3."), the service professional is to invoke a video recording application via the head-worn computing device to capture a video clip or recording, and the clip or recording will automatically be stored in association with the checklist item corresponding to the instruction step, for reporting purposes.

Consistent with some embodiments, an original electronic document may also be enhanced to include interactive GUI elements, as part of an interactive workflow, for capturing a signature of a service professional, as well as the date on which a particular task was completed. As illustrated in FIG. 4, a signature line 416 and an input box for a date 418 are shown. Consistent with some embodiments, a service professional operating a head-worn computer may use one or more audible or spoken commands to select the signature line 416 and then automatically annotate the line with an image of his or her signature. Similarly, the service professional may use one or more audible or spoken commands to populate the input item for the date with the current date and/or time. With some embodiments, speech-to-text may be used as an input method, to convert spoken words to text, for purposes of capturing a signature and/or date. Of course, other input methods—such as the head tracking technique described above—may also be used, consistent with embodiments of the invention.

Consistent with some embodiments of the invention, an interactive GUI element may be added to an enhanced electronic document as part of an interactive workflow in order to provide a service professional with the identity of a contact person (e.g., a technical specialist, or a supervising manager) associated with a task, a specific instruction step, or some subset of instruction steps, and to enable a simple mechanism by which the service professional can invoke a telepresence session with that contact person. By way of example, in the user interface 400 of FIG. 4, the name of a technical specialist is indicated in the top right portion 420 of the user interface. A service professional, who may be performing some task while in the field at a remote location, may invoke a telepresence application via the head-worn computing device to establish a communication session with the person identified as a technical specialist. For example, the service professional may simply call out one or more audible commands to invoke the telepresence session. Similarly, a supervising manager may be identified. With some embodiments, a particular icon (not shown in FIG. 4) may be positioned next to or near one or more specific instruction steps, such that the placement of the particular icon next to a particular instruction step indicates the existence of a contact person that is associated with the specific instruction step. If there are different people that should be consulted for different instruction steps, the service professional can navigate the instruction steps, and invoke a telepresence session with the correct contact person for the particular instruction step for which the service professional needs help.

In the enhanced electronic document presented in FIG. 4, the dashed-line bounding box with reference number 404 identifies original content from the original electronic document—specifically, a figure of an engine labeled as "FIG. 3." Consistent with some embodiments of the invention, enhancing the original electronic document with an interactive workflow may include adding GUI elements to some portion of content (e.g., the figure presented in bounding box 404) to indicate that additional resources are available. For instance, as illustrated in FIG. 4, the numbers (e.g., 1, 3 and 5) that are enclosed in circles, corresponding with reference numbers 422-A, 424-A and 426-A, indicate the availability of additional resources that, in this specific instance, provide further information or context relating to specific components or parts of the engine illustrated in FIG. 3 of the original content of the electronic document. For instance, the number one ("1.") enclosed by a circle, with reference number 422-A, is a callout indicating that for that particular component or part illustrated in the figure, an additional document is available. A thumbnail view or icon indicating the availability of the document is also presented in the top-left portion of the user interface, with reference number 422-B. Accordingly, a service professional can issue one or more spoken commands to access and view the additional document to obtain additional information about something specific that is being illustrated in the figure of the engine (FIG. 3). Similarly, the number three ("3.") enclosed with a circle 424-A corresponds with the media clip icon with reference number 424-B, indicating the availability of an additional resource. The link icon with reference number 426-B corresponds with the callout in FIG. 3 that has reference number 426-A. In this case, the link icon 426-B indicates the availability of a linked resource, such as a linked, web-based document.

While the enhanced electronic documents shown in FIGS. 3 and 4 both generally involve or relate to a task that is described in terms of discrete instruction steps, the present invention is by no means limited to such content. Specifically, other types of electronic documents can be integrated with an interactive workflow, consistent with embodiments of the invention. For example, an original electronic document may include a form with a series of questions and fields at which a service professional is to provide input (e.g., answers or observations, etc.). Such a document may include a table, with rows and columns, such that individual fields are intended to capture information about some observation made by an inspector. Such might be the case with an inspection report, where a first column describes a particular object or thing to be inspected, and a second column is provided for an inspector to record his or her observation of the condition of the object or thing described in the first column. An inspection report of this type might be enhanced by the document processing engine with a workflow that adds GUI elements proximate to one or more of the input fields, such that the interactive GUI elements allow an inspector, using a hands-free computing device such as a head-worn computer, to quickly generate input for the various fields by recording his or her observation, for example, by capturing sound clips and/or using a speech-to-text function of the hands-free computing device.

Figure 5:
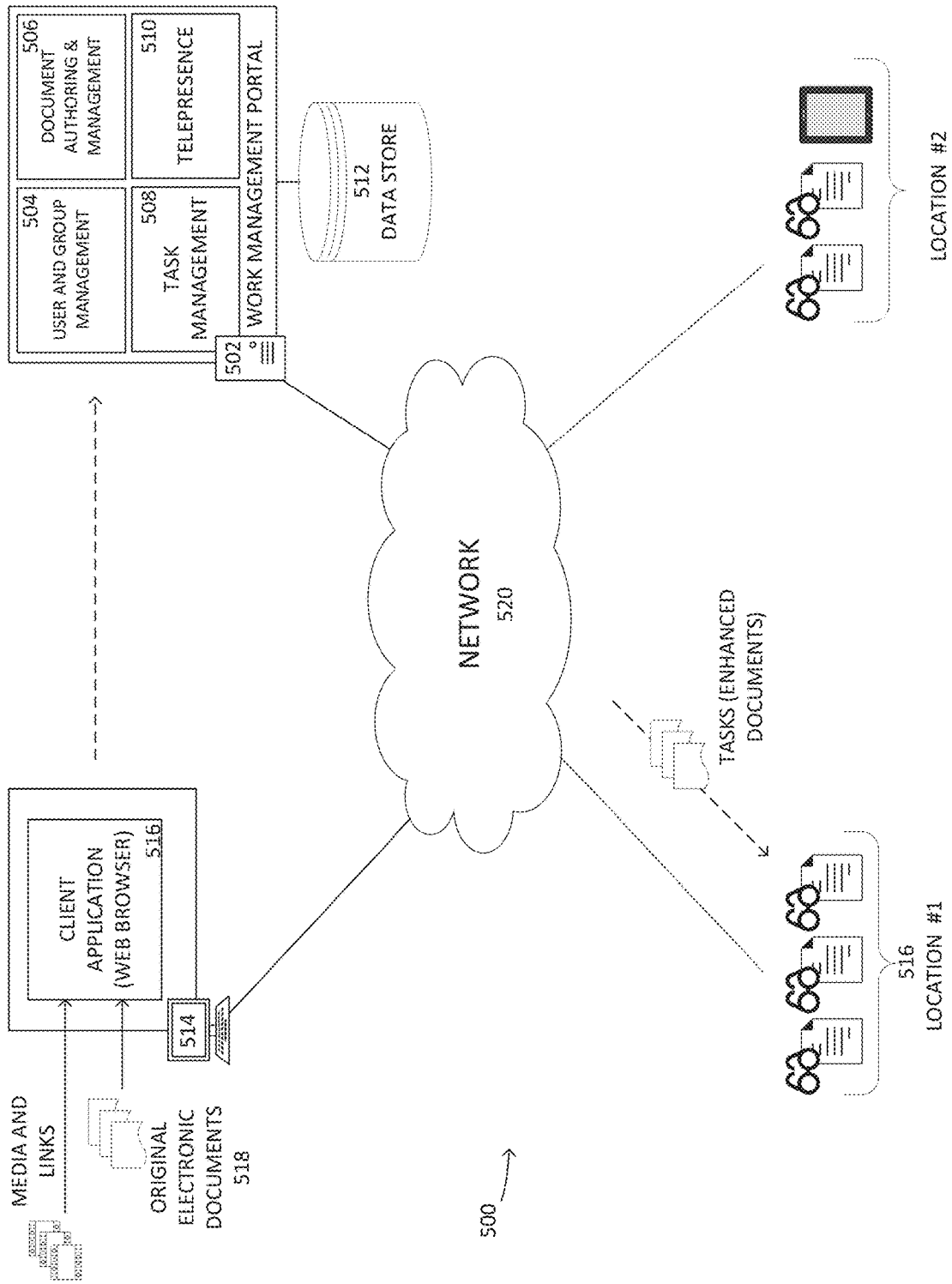
FIG. 5 is a diagram illustrating an example of a computer networking environment that includes a work management portal for use in facilitating the development and deployment of enhanced electronic documents, for consumption via mobile computing devices that operate in a hands-free mode to improve one's ability to perform any of a variety of tasks, consistent with various embodiments of the present invention.

FIG. 5 is a diagram illustrating an example of a computer networking environment 500 including various computer network-based applications and services for use in facilitating the development and deployment of enhanced electronic documents, consistent with various embodiments of the present invention. The document processing technique described and illustrated herein is one function provided by a document authoring and management service 506 of a work management portal executing on one or more server computer(s) 502. As illustrated in FIG. 5 and described below, the work management portal provides a variety of related services that, for example, allow an enhanced electronic document to be affiliated with a task that can ultimately be assigned and communicated to a service professional.

As illustrated in FIG. 5, a network-connected server computer 502 is shown to be executing applications and services relating to user and group management 504, document authoring and management 506, task management 508, and telepresence 510. The various applications and services provided by the server computer 502 are part of an enterprise- and role-based, work management portal. Accordingly, using the work management portal, an end-user associated with a particular enterprise or organization is able to upload to the server computer 502, and manage, one or more libraries of electronic documents 518 via a web-based interface of a web browser application 516 executing on a client computing device 514. Once the electronic documents have been uploaded, the electronic documents are processed to enhance those documents with interactive workflows via the document authoring and management tools 506 residing and executing at the server computer 502. After the one or more electronic documents have corresponding workflows, one or more workflows can be affiliated with a task and assigned to a variety of personnel via the task management service 508. Assigning a task to a service professional will cause an enhanced electronic document to be transferred over the network to a hands-free computing device, such that the service professional can view the document and interactive workflow, while performing the actual work described and detailed in the task.

The various applications and services illustrated in FIG. 5 are not meant to be an exhaustive representation of all applications and services that may be associated with and provided as part of a work management portal, but are presented and described herein to convey a general understanding of the context in which the present inventive subject matter may be deployed. Similarly, although the work management portal presented in FIG. 5 is illustrated and described as a client-server, web-based deployment, the inventive subject matter described herein is not limited to such an implementation. Finally, the work management portal is illustrated in FIG. 5 as being implemented on a single server computer 502. However, it will be readily appreciated that a variety of other implementations, including those based on a distributed computing environment involving multiple server computers and cloud computing deployments, are consistent with embodiments of the present invention.

Consistent with some embodiments, the work management portal may be enterprise- and role-based. For example, in some instances, the work management portal may provide work management services to any number of different enterprises or organizations, including enterprises and organizations other than the entity that owns, operates and provides the work management portal as a service. In such a scenario, each enterprise or organization will separately establish service with the provider of the work management portal, and the work management portal will be deployed to preserve the confidentiality and privacy of all data, including electronic documents, of each individual enterprise or organization. For example, only end-users having an affiliation with a particular enterprise and/or having specific roles associated with the enterprise will be able to access the library of electronic documents associated with that particular enterprise. With some alternative embodiments, the work management portal may be deployed in separate instances for each enterprise or organization, such that each enterprise or organization will have the responsibility of operating its own instance of the service.

The user and group management service 504 of the portal allows an authorized member of a particular enterprise or organization to manage members associated with the enterprise or organization by adding the members as end-users of the portal, and, for example, by defining and assigning roles to the various end-users. The role assigned to each individual end-user will determine the end-user's available data access privileges and define the various functionality available to the end-user via the portal. Similarly, an end-user's role may impact his or her access to data and applications via a hands-free computing device such as a wearable computer with a head-mounted display. By way of example, some end-users may be assigned an administrative or managerial role, allowing those end-users to upload electronic documents to the work management portal, generate workflows for the electronic documents, and approve and assign tasks to other end-users. Other end-users may be assigned roles that limit their access and privileges to performing certain workflow-based tasks, or groups of tasks, and so forth.

As shown in FIG. 5, the document authoring and management service 506 enables an authorized end-user to identify and upload documents over the network 520 via the client computer 514 and the web browser application 516. The uploaded electronic documents may then be selected for processing and editing (automatically and/or manually) with various document authoring tools, as described in greater detail below in connection with FIG. 6.

The task management service 508 enables an authorized end-user to generate and assign tasks to other end-users. By way of example and as illustrated in FIG. 5, when a task is assigned to a particular end-user, the task, including any workflows referenced in the task, is communicated to a hands-free computing device 516 of the end-user. When a task is initially assigned to a particular end-user, that end-user will receive a notification of the task having been assigned. For example, upon a task being assigned to an end-user, the task management service 508 may generate a notification with various information about the task and then communicate that notification to the end-user in one (or more) of several ways. For example, the notification may be communicated to a registered email address of the end-user, or, the notification may be communicated to a hands-free computing device and presented to the end-user via a task management application that is executing at the hands-free computing device, such as a wearable computing device with a head-mounted display. With some embodiments, a separate mobile application executing on a mobile computing device, such as a device that uses one of the well-known iOS® or Android® operating systems, may receive and display the notification to the end-user, indicating the assignment of the task to the end-user.

In addition to communicating a notification to the end-user with information about the assigned task, the task itself, including any workflows as embodied in enhanced electronic documents associated with the task, are communicated over the network to a client-based task management application executing on a hands-free computing device of the end-user. For example, if the end-user is currently logged in to an appropriate hands-free computing device, the communication of the task to the hands-free device may occur immediately after the task is assigned. However, if the end-user to whom the task has been assigned is not currently logged in to an appropriate hands-free computing device, the task may be requested by a task management application executing at the hands-free computing device, and thus communicated to the device at the time the end-users does log in.

The telepresence service 510 of the work management portal provides the ability for end-users to communicate with one another via video-based conferencing in real time. For instance, the telepresence service 510 allows a special type of communication session between and amongst on-site service professionals and one or more remote service professionals. Specifically, during a telepresence session, a remote service professional is able to view live video streams generated by an image sensing device of a head-worn computing device worn by an on-site service professional and communicate with the on-site service professional. This allows a remote service professional, for example, a supervising manager who may be operating a laptop or desktop computer, to have the same viewpoint as an on-site service professional.

Figure 6:
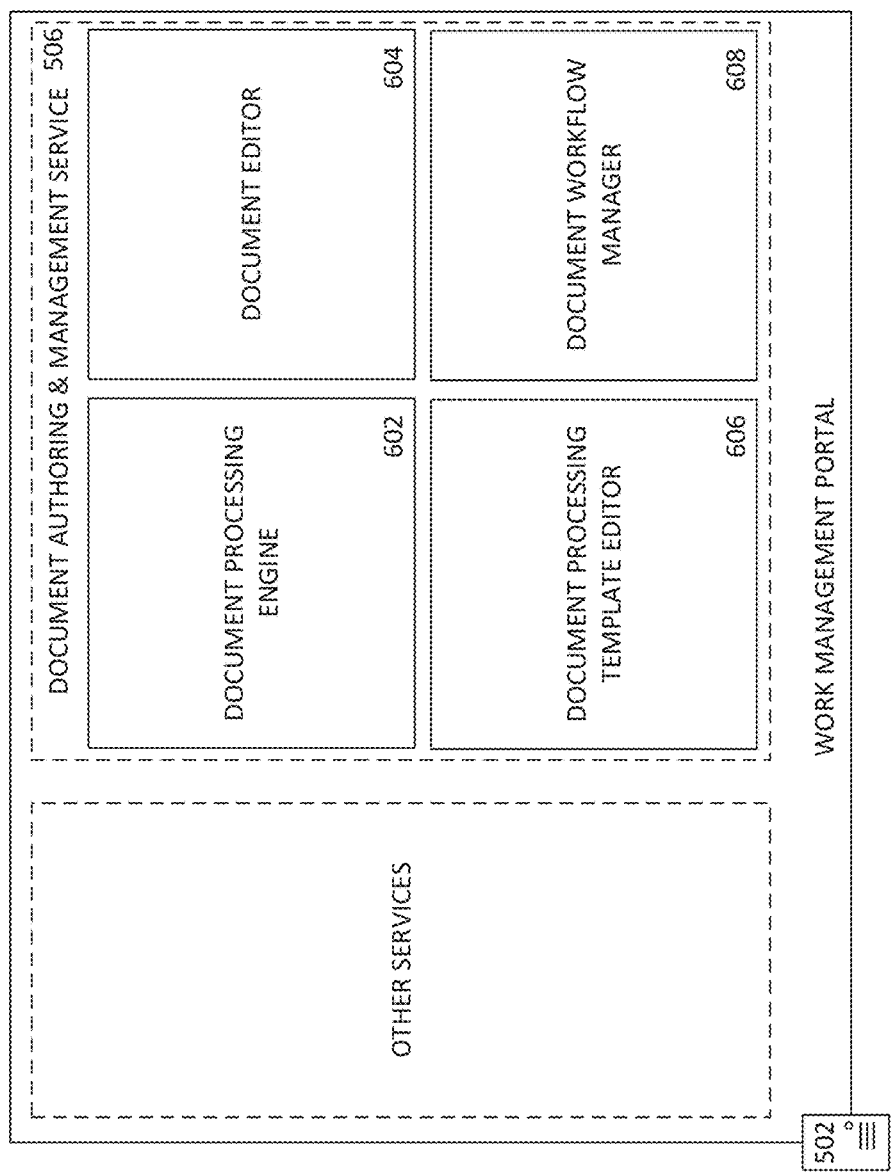
FIG. 6 is a diagram illustrating an example of the various applications and services included as part of a document authoring and management service that is part of a work management portal, consistent with some embodiments of the present invention.

FIG. 6 is a diagram illustrating an example of the various applications and/or services included with a document authoring and management service 506 that is part of a work management portal, consistent with some embodiments of the present invention. As illustrated in FIG. 6, the document authoring and management service 506 includes a document processing engine 602, a document editor 604, a document processing template editor 606, and a document workflow manager 608. The functionality of these applications and services are described below in connection with the descriptions of FIGS. 7 through 11 that follow.

Figure 7:
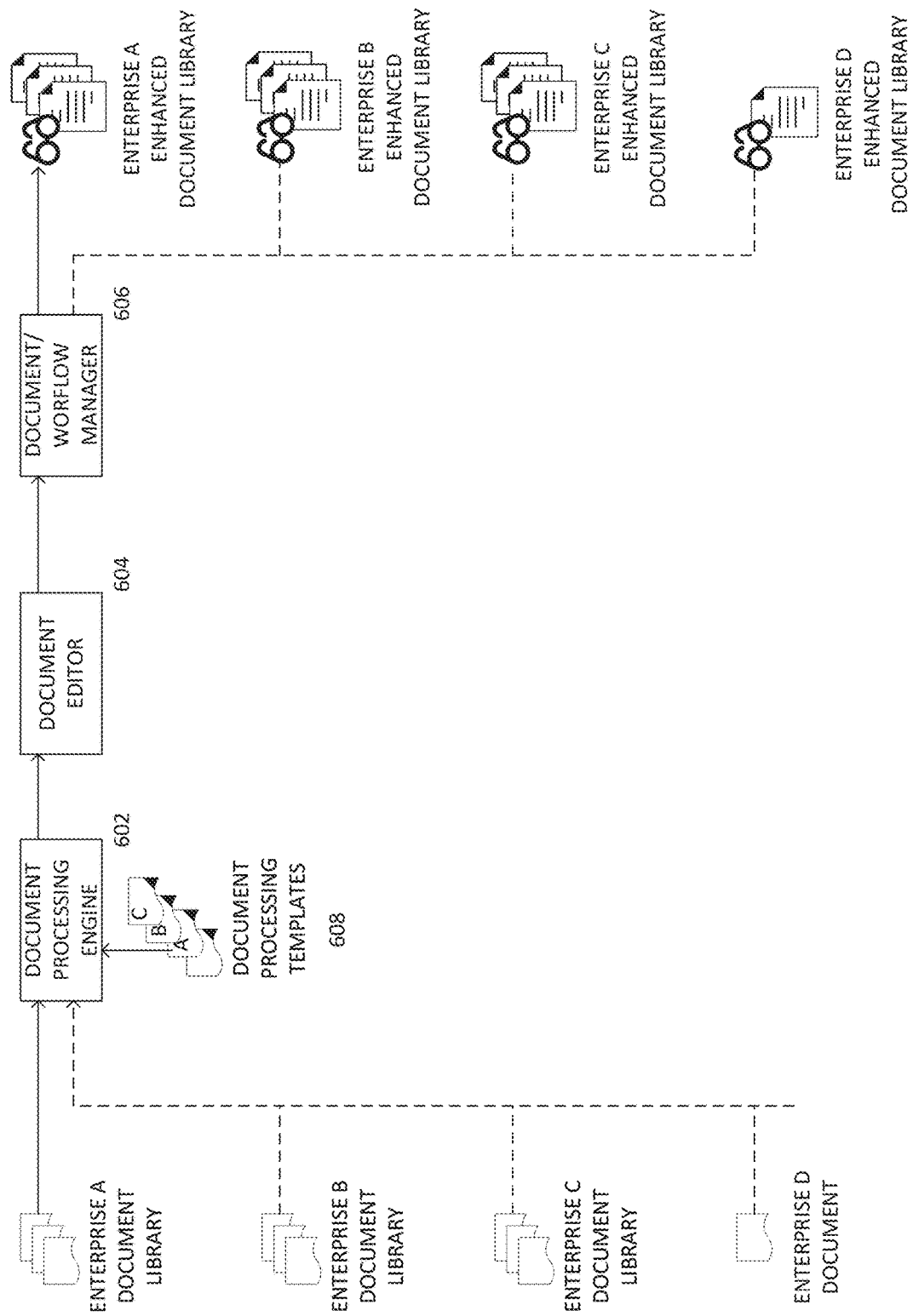
FIG. 7 is a diagram illustrating the various operations that are performed when generating interactive workflows to correspond with a library of electronic documents, consistent with some embodiments of the present invention.

Referring now to FIG. 7, the document processing engine 602 receives and processes original electronic documents in order to identify individual content items within the original electronic documents that correspond with individual steps, instructions, figures and/or input fields, and so forth, as included in the original content of the original electronic document. An authorized end-user for a particular enterprise or organization may upload to the document authoring service of the work management portal one electronic document or an entire library of electronic documents. Once an original electronic document has been uploaded, an end-user of the document authoring service will identify one or more electronic documents to be processed by the document processing engine 602. Additionally, with some embodiments, the end-user-user may specify a particular document processing template 608 that is to be used by the document processing engine 602 to process one or more original electronic documents. For instance, as illustrated in FIG. 7, several different document processing templates 608 are shown. With some embodiments, each different document processing template includes a different set of rules or instructions for use by the document processing engine 602 to identify content items within the original electronic document by searching for and identifying various patterns within the content of the original electronic document. In other words, each document processing template is created with a specific set of rules and/or instructions for identifying individual content items within an electronic document based on the expected structure and content of the electronic document. Accordingly, if the end-user is aware of a particular structure of the content within an original electronic document, the end-user will select the document processing template that corresponds with the expected structure of the electronic document. By way of example, an electronic document including content in the form of an inspection report with a table and/or various input fields may be automatically processed by the document processing engine using a specific document processing template having specific rules and instructions for processing that type of document. Similarly, another electronic document with instructions for performing a task may be processed by the document processing engine with a different document processing template, having specific rules and instructions for identifying the separate instances of the instruction steps associated with the task.

Consistent with some embodiments, in addition to including the specific rules and instructions for identifying various content items within the content of an electronic document, each document processing template may also include rules and instructions for generating the data objects associated with the various content items as part of the interactive workflow. For instance, each document processing template may specify the number of interactive GUI elements, as well as the specific type of interactive GUI elements, that are to be generated and associated with each individual content item identified in the electronic document. Additionally, the document processing template may have rules and/or instructions specifying the location or position with the electronic document that each interactive GUI element is to be presented. The information regarding the GUI elements is written to a file as individual data objects (e.g., JSON objects), which is ultimately embedded within the electronic document. Accordingly, a document processing template for an electronic document that includes individual steps for performing a task may have rules or instructions for creating a data object that corresponds with an interactive checklist item, such that each individual instruction step of the task, when presented via an appropriate document viewing application executing at a hands-free computing device, will be presented with an interactive checklist item as part of the interactive workflow. Alternatively, a document processing template for processing an electronic document that includes an inspection report may include rules or instructions for creating data objects that are consistent with a different type of GUI element—specifically, a GUI element indicating that an inspector is to use a text-to-speech function of a hands-free computing device to provide input relating to some observation. In yet other instances, the document processing template may include rules and instructions for adding different types of GUI elements as part of the interactive workflow represented by the data objects in the file that is embedded with the electronic document. The document processing template that is used to generate the data objects that correspond with the interactive GUI elements of the workflow may also specify default behavior for various GUI elements. By way of example, a document processing template used to generate a set of interactive checklist items that correspond with instruction steps may generate the data objects with metadata that indicates that the checklist items can only be navigated in order, such that, the separate instruction steps must be performed in order.

As illustrated in FIG. 6, with some embodiments, a document processing template editor 606 may be provided to assist in the creation, management, testing and deployment of document processing templates. For example, the document processing template editor may include a special interface that allows an end-user to interact with an electronic document to identify various aspects of the document that define specific content items that are to be identified by the document processing engine, such that those aspects identified by the end-user are used to generate the relevant rules and instructions. Similarly, the document processing template editor may operate in conjunction with the document processing engine 602 to iteratively step through an example electronic document, allowing one to identify content items, and immediately see how the document processing engine would generate GUI elements.

Although the document processing engine is shown in FIG. 7 as using a document processing template, with some alternative embodiments, the document processing engine 602 may not require the use of a document processing template. Instead the document processing engine 602 may be configured to recognize a variety of different document structures, based on a variety of different rules and instructions, which are internally accessible to the document processing engine 602, for identifying different patterns in the content of various electronic documents. Accordingly, at least with some embodiments, it will not be necessary for an end-user to explicitly specify a particular document processing template, as the document processing engine operates independently to identify the structure and format of a document.

Figure 8:
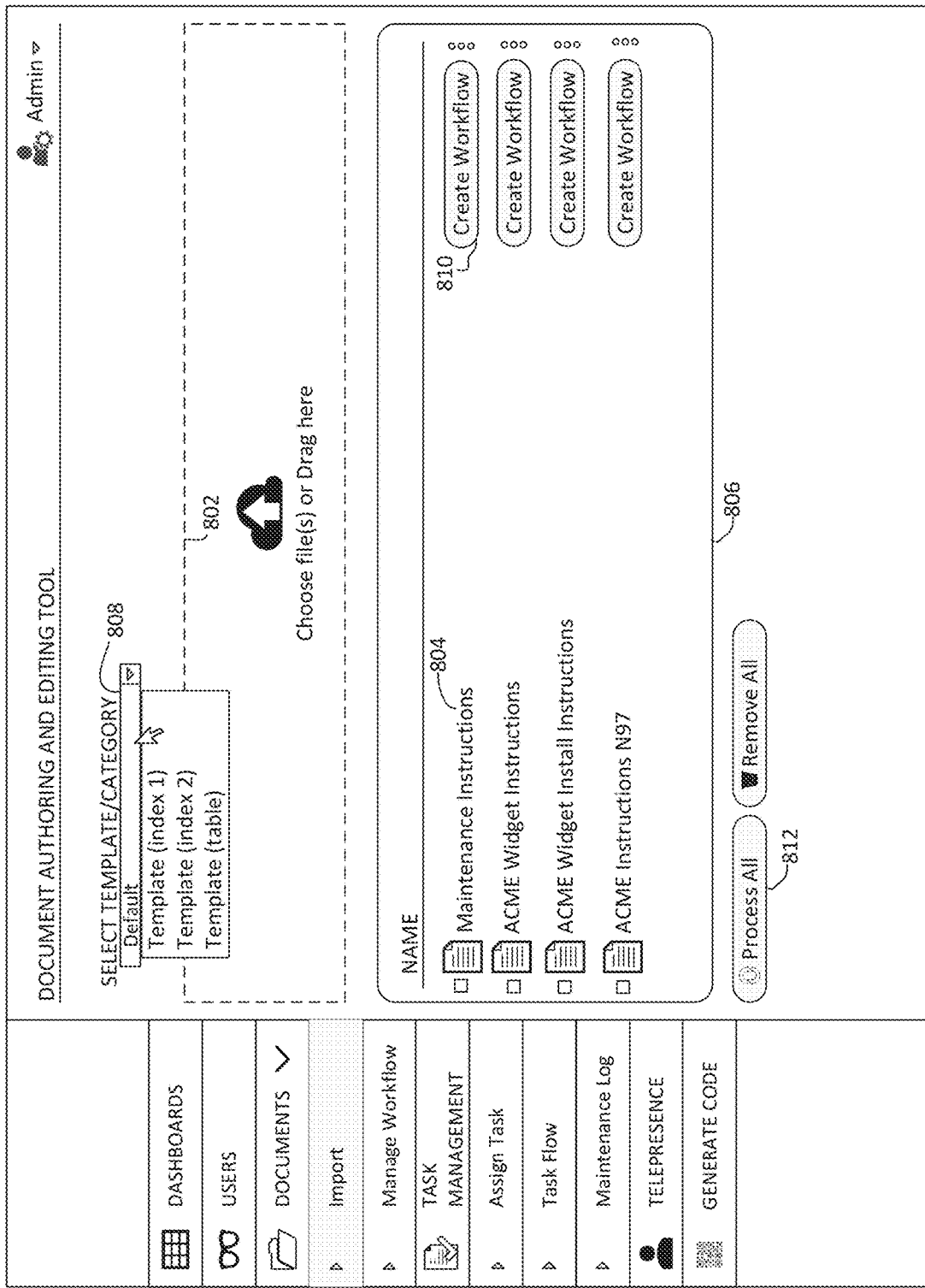
FIGS. 8 and 9 are diagrams illustrating examples of user interfaces for a document authoring service that includes a document processing engine for automatically processing an electronic document to generate a workflow for the electronic document, consistent with some embodiments of the present invention.

Referring now to FIG. 8, a diagram showing an example of a user interface for a document authoring service is illustrated. In this example, an end-user may initially upload an electronic document by interacting with the user interface via a cursor control device to drag an icon, representing the electronic document, to the portion of the user interface with reference number 802. Alternatively, an end-user may be presented with a user interface (e.g., a file picker) allowing the end-user to browse and select one or more electronic documents from a local or remote storage location. In any case, once an electronic document has been uploaded, the name of the electronic document will appear in a list of recently uploaded and/or available documents, such as the document with the name, "Maintenance Instructions," 804 in the list with reference number 806. As indicated by the drop-down selection list with reference number 808, with some embodiments, the user interface provides a mechanism by which the end-user can specify a particular document processing template to be used by the document processing engine when processing an original electronic document. As illustrated in FIG. 8, to invoke the document processing engine and initiate the automatic process for generating an interactive workflow for a particular electronic document, an end-user may select a button that corresponds with a particular electronic document, such as the button with label, "Create Workflow," and reference number 810. With some embodiments, multiple electronic documents can be selected, for example, via the selection of a check box associated with each electronic document, and a batch process can be invoked by selecting a button with label, "Process All," and reference number 812.

Figure 9:
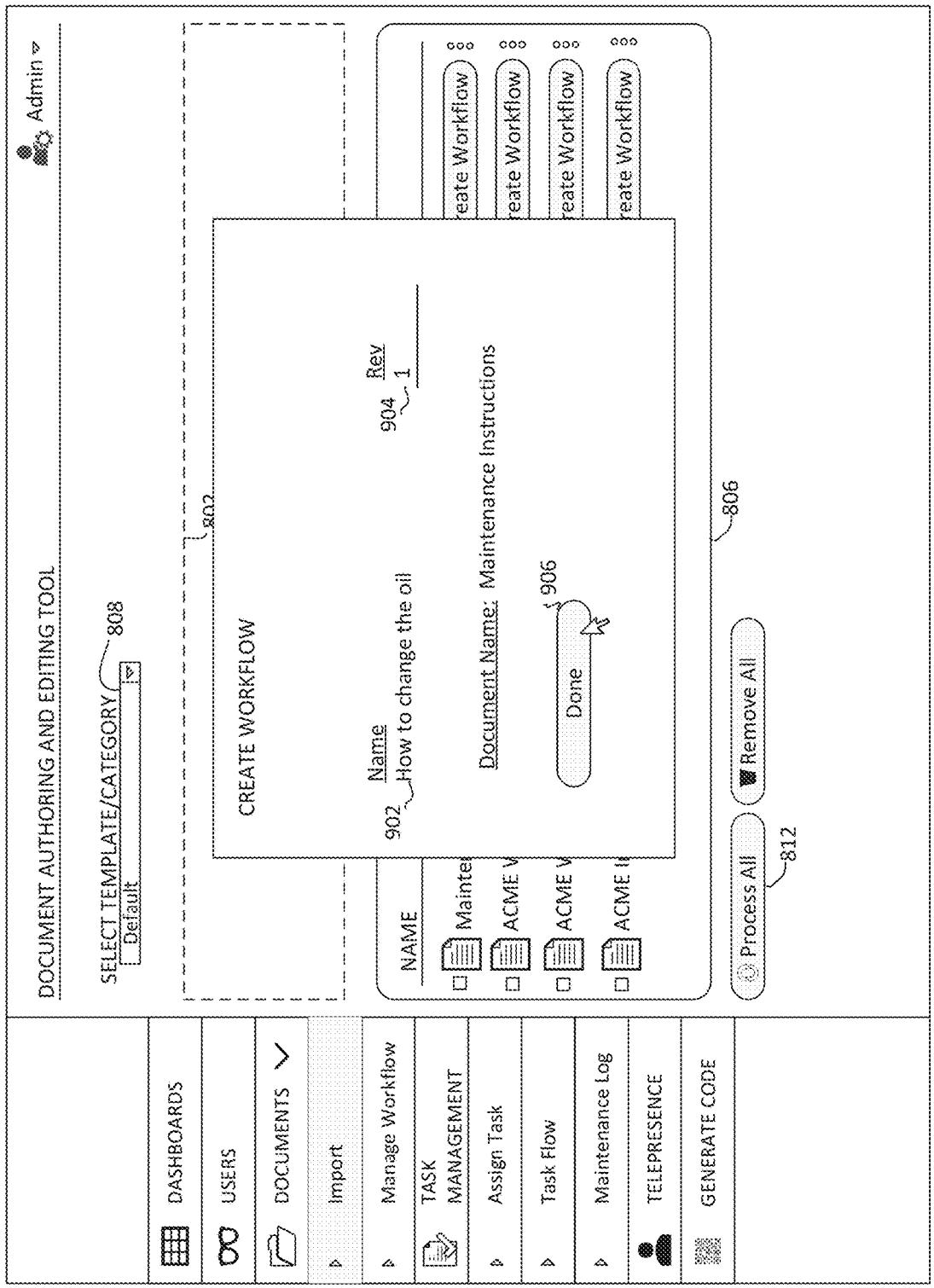

As illustrated in FIG. 9, before the document processing engine begins processing the original electronic document, the end-user is prompted to provide a name 902 for the interactive workflow that is to be generated as a result of the automated document processing step, and ultimately associated with the electronic document. Additionally, with some embodiments, the document authoring service supports a version control feature that enables an end-user to specify a revision number 904 for a workflow that is being generated. Finally, as shown in the example of FIG. 9, when the end-user has provided a name for a workflow, and indicated a revision number, the end-user is prompted to select the button labeled "Done" 906 to invoke the document processing engine.

Referring again to FIGS. 6 and 7, the document processing engine 602 will process one or more original electronic documents by analyzing the content of the electronic document in accordance with a set of instructions or rules specified in the document processing template that has been selected by the end-user. In some instances, it may be necessary for the document processing engine to perform an optical character recognition (OCR) process on the content of the document in order to properly recognize the text included within the content of the document. For each instance of a content item identified by the document processing engine in accordance with the instructions and/or rules of the selected document processing template, a data object is generated and added to a file. The data object, which is generated in accordance with the rules and instructions of the selected document processing template, denotes the specific location within the electronic document of the content item and includes information about one or more GUI elements to be presented with the content item as part of the interactive workflow. Once all of the content items have been identified by the document processing engine 602, a file containing the data objects is embedded within the original electronic document, resulting in an enhanced electronic document. This enhanced electronic document, when presented via an appropriate document viewing application of a hands-free computing device, will present not only the original content of the electronic document, but also an interactive workflow consisting of one or more GUI elements that are rendered based on the data objects notated in the file that has been embedded within the electronic document.

As shown in FIG. 7, an electronic document may first be automatically processed by the document processing engine 602, and then subsequently edited manually via a document editor 604. As such, the document editing application 604, in some instances, takes as input an enhanced electronic document—that is, an electronic document that already includes an embedded file with data objects that can be rendered as GUI elements that are part of an interactive workflow. However, with some embodiments, the document editing application 604 can also take as input an original electronic document—that is, an electronic document that has not yet been processed by the document processing engine 602, and therefore does not yet have a file embedded within. When the document editor 604 is used to edit an original electronic document, the document editor 604 will generate and embed a file containing the relevant data objects within the electronic document. Furthermore, the document editor 604 can be used to manually select (and therefore identify) individual content items within the electronic document. For example, using a cursor control device, an end-user may simply draw a bounding box around a selection of text to identify the text as a separate instance of a content item. Doing so would create a data object to correspond with the identified content item.

Turning now to FIG. 10, a user interface is shown illustrating an example of an electronic document that has been processed to automatically identify individual content items within the electronic document that correspond with individual instructions for performing a task, according to some embodiments of the invention. As illustrated in FIG. 10, the enhanced electronic document is presented via a user interface of a document editing application (such as the document editor illustrated in FIG. 6 with reference number 604) provided as part of the work management portal. Once a particular electronic document has been automatically processed by the document processing engine 602, an end-user can manually edit the enhanced electronic document via the document editing application 604. As illustrated in FIG. 10, the user interface of the document editing application indicates or denotes the individual content items that have been identified by the document processing engine by displaying a semi-transparent bounding rectangle around each instance of a content item. By way of example, the step that is enumerated as step one ("1.") is bounded by a semi-transparent rectangle 1002 to indicate that the text associated with that individual step or instruction has been identified by the document processing engine as a separate content item. In addition, the document editing application reads and processes the file that has been embedded within the electronic document and renders any GUI elements that have been associated with individual content items, based on the various data objects within the embedded file. In this example, the content of the electronic document is a series of steps or instructions for performing a task (changing the oil), and as such, the GUI elements are individual checklist items for each individual step for performing the task.

Figure 11:
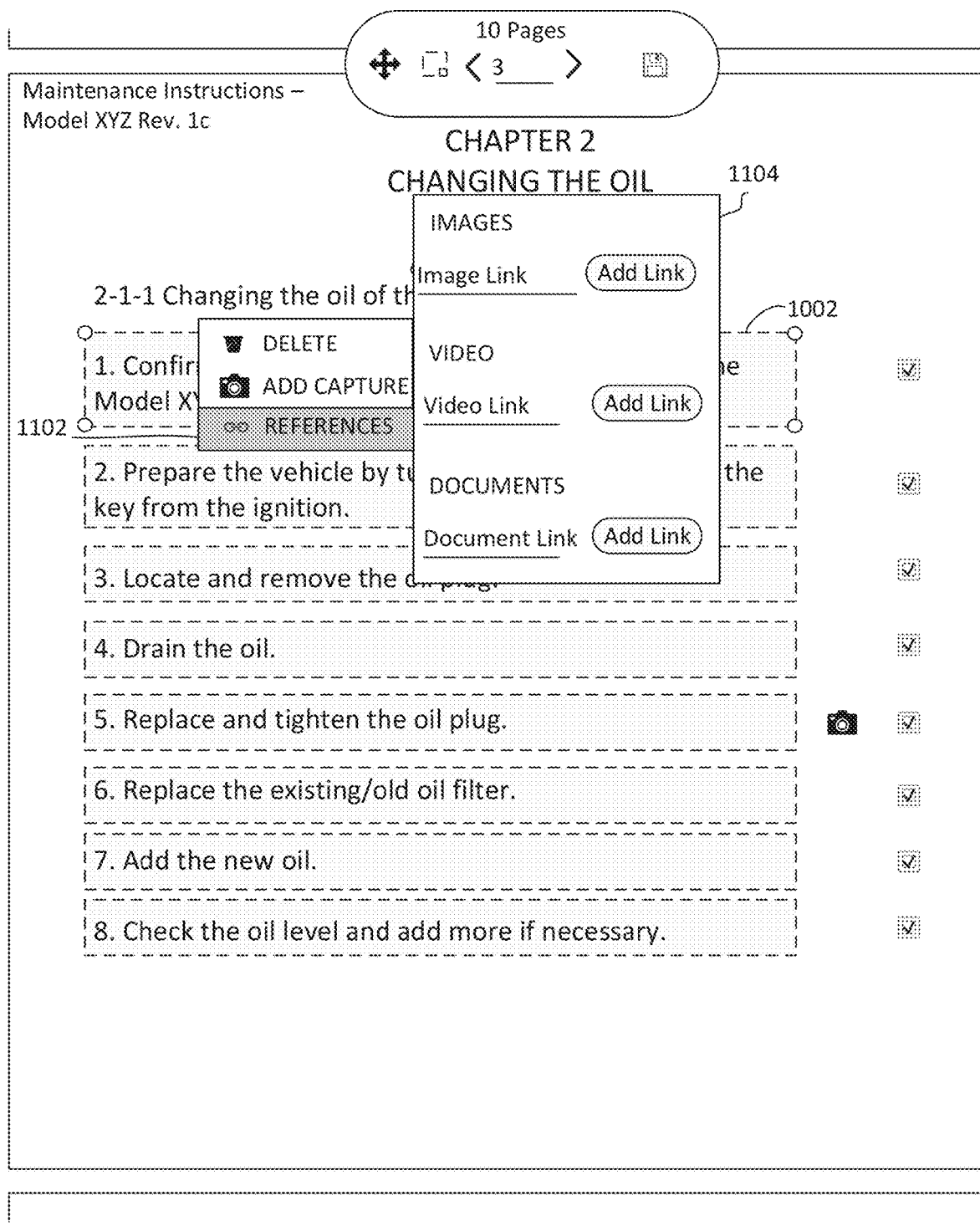
FIG. 11 is a diagram illustrating an example of a user interface of an electronic document editing application that allows one to customize a user interface associated with an interactive workflow with various interactive elements, according to some embodiments of the present invention.

Referring now to FIG. 11, by interacting with the user interface of the document editing application, an end-user can select any one of the highlighted content items. For example, as shown in FIG. 11, an end-user has selected the content item that is highlighted and bounded by the semi-transparent rectangle with reference number 1002. When the end-user selects a content item, the user interface presents a menu 1102 including a variety of options for editing the interactive workflow. More precisely, when a particular content item is selected, the editing options allow the end-user to add or delete various GUI elements to the workflow, specify various behaviors for the GUI elements, and/or arrange or position the location within the electronic document that certain GUI elements will appear. In the particular example shown in FIG. 11, having selected the option to add/remove references, as indicated by reference number 1102, the end-user is presented with a dialogue box 1104 prompting for information about various additional resources that might be presented in connection with the selected instruction step—in this case, the instruction step enumerated as step one ("1."). The additional references that an end-user might associate with a particular content item (e.g., the content item with reference number 1102 in FIG. 11), are those references that appear in the top portion of the user interface as shown in the example user interface presented in FIG. 3. Accordingly, by specifying and adding an image link, a video link, or a document link, as shown in the dialogue box 1104, the document editing application will create or modify a data object within the file that has been embedded within the electronic document to include information about how and where the specified resource is to appear as part of the interactive workflow within the enhanced electronic document, when the enhanced electronic document is being presented and viewed on a hands free computing device, such as a head-worn computing device.

While the example illustrated in FIG. 11 shows how an end-user might add to a workflow a GUI element relating to the presentation of additional resources or references, the document editing application provides the ability to manually add a wide variety of other GUI elements as part of an interactive workflow. For example, using a document editing application, one might add/delete/modify one or more checklist items that correspond with specific instruction steps set forth in the original content of an electronic document. Similarly, any one of the many GUI elements illustrated and described in connection with FIG. 4 may be added to an enhanced electronic document using the document editing application.

Referring again to FIG. 6, after an electronic document has been processed by the document processing engine 602, and then edited manually with the document editor 604, the enhanced electronic document is stored in a manner accessible to a document-workflow manager 606. With some embodiments, each enhanced electronic document may be associated with a status that can be modified via the document-workflow manager. For example, an original electronic document that has not yet been processed by the document processing engine 602 and has not yet been manually edited using the document editing application 604 may have a status (e.g., "unprocessed") indicating such. Generally, a status of "unprocessed" indicates that the electronic document does not have an embedded file representing an interactive workflow. An enhanced electronic document—that is, one that includes an embedded file with information required to render GUI elements associated with an interactive workflow—may be indicated as having a status of "processed." Accordingly, with some embodiments, before an enhanced electronic document can be affiliated with a task and assigned to a service professional, an administrative end-user is required to review and approve the enhanced electronic document and change its status (e.g., "approved"). Finally, when an enhanced electronic document has been approved, as reflected by its status, the enhanced electronic document can be affiliated with a task and assigned to a service professional, as described below.

Figure 12:
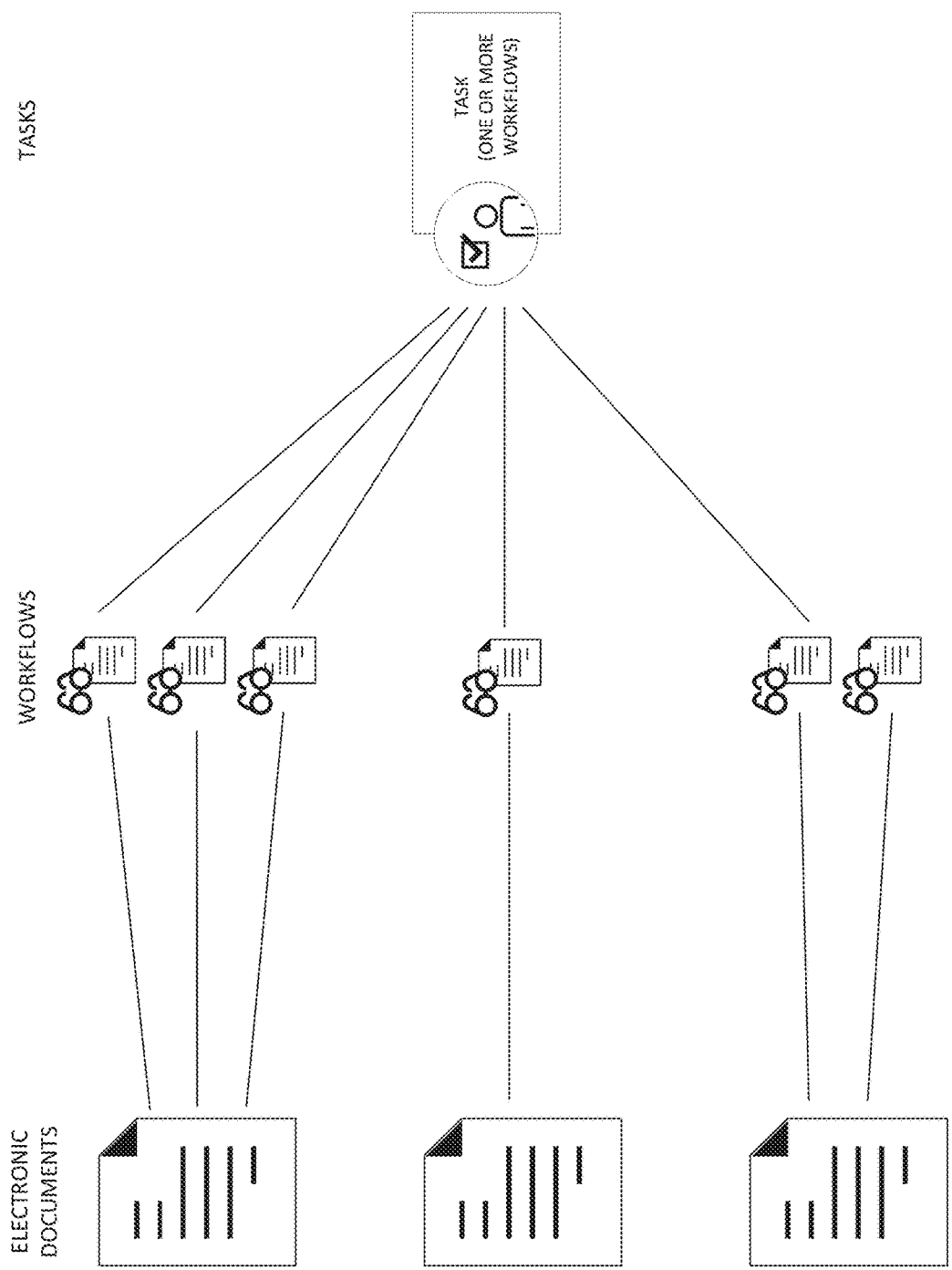
FIG. 12 is a diagram illustrating an example of the relationship between electronic documents, workflows, and tasks, consistent with some embodiments of the present invention.

FIG. 12 is a diagram illustrating an example of the relationship between electronic documents, workflows, and tasks, consistent with some embodiments of the present invention. As shown in FIG. 12, consistent with some embodiments of the present invention, each electronic document may be associated with one or more workflows. Accordingly, a very lengthy PDF document that has separate chapters or sections may have a separate workflow for each chapter or section. Each independent workflow may be represented by its own instance of the electronic document with an embedded file. Furthermore, a task—as a formally defined concept within the realm of the work management portal—may be affiliated with one or more workflows. Therefore, when a task is assigned to a service professional, the task may reference more than one workflow, and therefore more than one enhanced electronic document.

Furthermore, a workflow may reference one or more additional workflows, such that, when a service professional is interacting with one workflow, the service professional may be able to invoke a second workflow. For example, the completion of a task may involve performing some portion of one workflow (e.g., some subset of instruction steps) and then switching to and completing a second workflow, before returning to and completing the instruction steps of the original workflow. Similarly, in the context of a workflow involving an inspection report, where a service professional navigates the inspection report while recording his or her observations, one or more sub-reports embodied in one or more separate workflows may be accessible via the top-level workflow. Accordingly, with some embodiments, one or more workflows may be nested within another workflow, providing a service professional with significant flexibility in navigating the enhanced electronic documents.

With some embodiments, using the document editing application, one may add a GUI element to an enhanced document to indicate the availability of a nested workflow. For example, an icon positioned next to an individual instruction step associated with a checklist item may indicate the availability of a separate workflow that may need to be completed in order to complete a particular instruction step. The underlying data object for the checklist item and/or the icon indicting availability of a nested workflow may include metadata that controls the order in which operations must occur, such that in some instances, a nested workflow can be made mandatory. This would ensure that a service professional completes each nested workflow in a certain order, as the individual instruction steps of a top-level workflow are completed.

Figure 13:
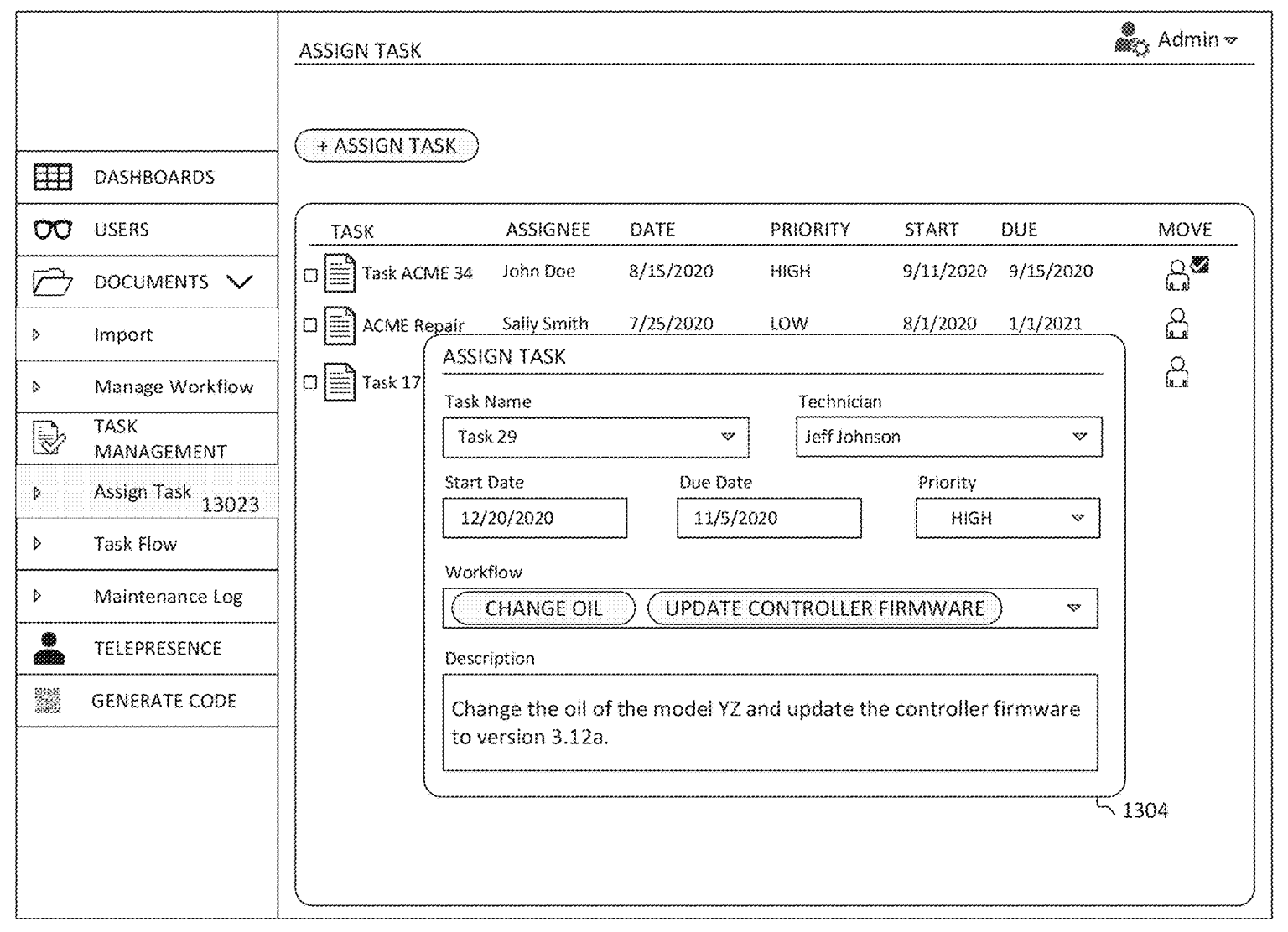

FIGS. 13 and 14 are diagrams illustrating examples of user interfaces for a task management service that is part of a work management portal, such that the task management service allows one to create, assign and communicate tasks to service professionals, according to some embodiments of the present invention. As illustrated in FIG. 13, the work management portal includes a user interface relating to the assignment of tasks 1302. Generally, only those tasks that have been approved, and thus have been designated with a particular status, will appear in the list of tasks available to assign to a service professional. After selecting one or more individual tasks, and then selecting the button with label, "+Assign Task," the end-user is presented with a dialog box 1304 prompting the end-user to provide a variety of information relating the task to be assigned. The information includes a task name, a service professional or technician to whom the task is to be assigned, a start date, a due date, and a priority designation (e.g., low, medium, high). Additionally, the end-user specifies one or more workflows that are to be referenced and completed as part of the task.

As illustrated in FIG. 14, once a task has been formally defined by providing all of the relevant information, the task can be officially assigned to the designated service professional by selecting an icon 1402 associated with the task and confirming that the task is to be communicated (e.g., "pushed") to the assigned service professional. Once a task has been formally assigned to a service professional, the task management application will generate a notification with some or all information about the task and communicate the notification to the assigned service professional. The notification may be communicated to the service professional via email, via a mobile application executing on a mobile computing device (e.g., a mobile phone or tablet computing device), and/or an application executing on a hands-free mobile computing device, such as a wearable computing device with a head-mounted display. In addition to communicating a notification to a device of the service professional, the task—specifically, any enhanced electronic document (e.g., as may be associated with any workflow referenced in the task)—will also be communicated to a task management application executing on a hands-free device of the service professional, allowing the end-user to recall the various workflows referenced within the task and then view and interact with the interactive workflows, and so forth.

Certain embodiments are described herein as including a number of components, modules, or mechanisms. Modules may constitute either of software modules (e.g., code embodied on a machine-readable medium or machine-readable storage device) or hardware modules. A "hardware module" is a tangible unit capable of performing certain operations and may be configured or arranged in a certain physical manner. In various example embodiments, one or more computer systems or devices (e.g., a standalone computer system, a client computer system, or a server computer system) or one or more hardware modules of a computer system or device (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a FPGA or an ASIC. A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 15:
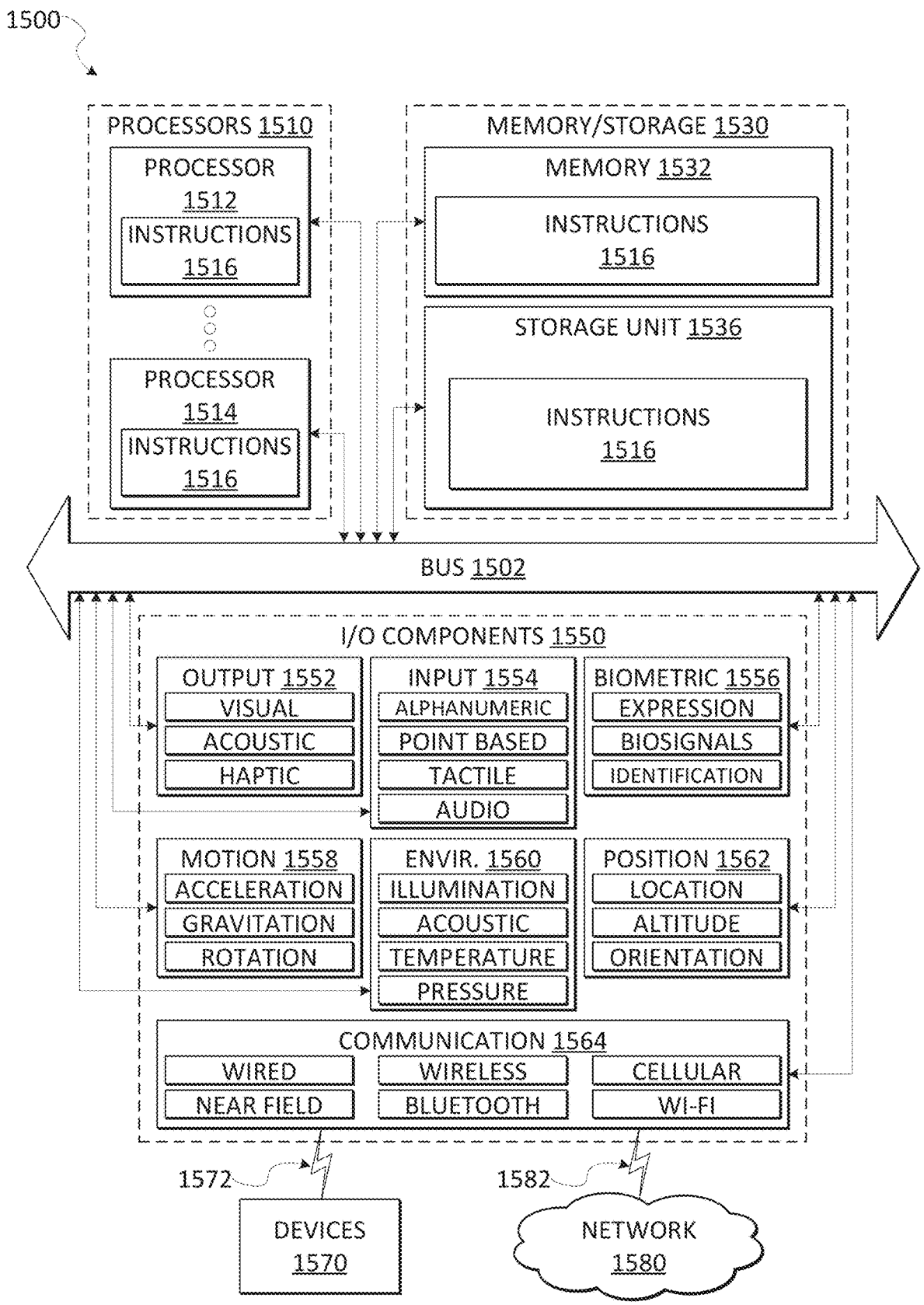
FIG. 15 is a block diagram illustrating components of a machine, according to some example embodiments, able to read instructions from a machine-readable medium (e.g., a machine-readable storage medium or machine-readable storage device) and perform any one or more of the methodologies discussed herein.

FIG. 15 is a block diagram illustrating components of a machine 1500, according to some example embodiments, able to read instructions from a machine-readable medium (e.g., a machine-readable storage medium or machine-readable storage device) and perform any one or more of the methodologies discussed herein. Specifically, FIG. 15 shows a diagrammatic representation of the machine 1500 in the example form of a computer system or device, within which instructions 1516 (e.g., software, a program, an application, an applet, an app, or other executable code) for causing the machine 1500 to perform any one or more of the methodologies discussed herein may be executed. For example, the instructions 1516 may cause the machine 1500 to execute the any one of the algorithms or methodologies described herein, particular those associated with the automated document processing engine and document editor. Additionally, or alternatively, the instructions 1516 may implement one or more of the devices or systems illustrated in one of FIG. 5 or 6.

The instructions 1516 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a PDA, or any machine capable of executing the instructions 1516, sequentially or otherwise, that specify actions to be taken by machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 may include processors 1510, memory/storage 1530, and I/O components 1550, which may be configured to communicate with each other such as via a bus 1502. In an example embodiment, the processors 1510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 1512 and processor 1514 that may execute the instructions 1516. The term "processor" is intended to include multi-core processor that may comprise two or more independent processors (sometimes referred to as "cores") that may execute instructions 1516 contemporaneously. Although FIG. 10 shows multiple processors 1510, the machine 1500 may include a single processor with a single core, a single processor with multiple cores (e.g., a multi-core processor), multiple processors with a single core, multiple processors with multiples cores, or any combination thereof.

The memory/storage 1530 may include a memory 1532, such as a main memory, or other memory storage, and a storage unit 1536, both accessible to the processors 1510 such as via the bus 1502. The storage unit 1536 and memory 1532 store the instructions 1516 embodying any one or more of the methodologies or functions described herein. The instructions 1516 may also reside, completely or partially, within the memory 1532, within the storage unit 1536, within at least one of the processors 1510 (e.g., within the processor's cache memory), or any suitable combination thereof, during execution thereof by the machine 1500. Accordingly, the memory 1532, the storage unit 1536, and the memory of processors 1510 are examples of machine-readable media.

As used herein, "machine-readable medium" includes a machine-readable storage device able to store instructions 1516 and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1516. The term "machine-readable medium" shall also be taken to include any medium, or combination of multiple media, that is capable of storing instructions (e.g., instructions 1516) for execution by a machine (e.g., machine 1500), such that the instructions, when executed by one or more processors of the machine 1500 (e.g., processors 1510), cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 1550 may include a wide variety of components to receive input, provide output, produce output, transmit information, exchange information, capture measurements, and so on. The specific I/O components 1550 that are included in a particular machine will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 10. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1550 may include biometric components 1556, motion components 1558, environmental components 1560, or position components 1562 among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 may include acceleration sensor components (e.g., accelerometer), gravitation sensor components, rotation sensor components (e.g., gyroscope), and so forth. The environmental components 1560 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1562 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via coupling 1582 and coupling 1572, respectively. For example, the communication components 1564 may include a network interface component or other suitable device to interface with the network 1580. In further examples, communication components 1564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1570 may be another machine or any of a wide variety of peripheral devices (e.g., a peripheral device coupled via a USB).

Moreover, the communication components 1564 may detect identifiers or include components operable to detect identifiers. For example, the communication components 1564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF416, Ultra Code, UCC RSS-2D bar code, and other optical codes), or acoustic detection components (e.g., microphones to identify tagged audio signals). In addition, a variety of information may be derived via the communication components 1564, such as location via Internet Protocol (IP) geo-location, location via Wi-Fi® signal triangulation, location via detecting a NFC beacon signal that may indicate a particular location, and so forth.

In various example embodiments, one or more portions of the network 1580 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1580 or a portion of the network 1580 may include a wireless or cellular network and the coupling 1582 may be a Code Division Multiple Access (CDMA) connection, a Global System for Mobile communications (GSM) connection, or other type of cellular or wireless coupling. In this example, the coupling 1582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1516 may be transmitted or received over the network 1580 using a transmission medium via a network interface device (e.g., a network interface component included in the communication components 1564) and utilizing any one of a number of well-known transfer protocols (e.g., hypertext transfer protocol (HTTP)). Similarly, the instructions 1516 may be transmitted or received using a transmission medium via the coupling 1572 (e.g., a peer-to-peer coupling) to devices 1570. The term "transmission medium" shall be taken to include any intangible medium that is capable of storing, encoding, or carrying instructions 1516 for execution by the machine 1500, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure, embodiment, or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

We claim:

1. A computer-implemented method comprising:
   receiving at a document management service of a server computer an electronic document to be enhanced with an interactive workflow comprising, in part, a plurality of individual graphical user interface elements that correspond with a plurality of individual content items set forth within the content of the electronic document;
   with a document processing engine executing at the server computer, processing content of the electronic document in accordance with a set of rules to identify the plurality of individual content items within the electronic document by recognizing one or more patterns in content of the electronic document;
   generating a first file with a data object for each individual content item identified in the electronic document, wherein each data object includes information indicating a position within the electronic document at which the individual graphical user interface elements associated with the interactive workflow are to be presented when the content of the electronic document is presented by a document viewing application executing at a wearable computing device with a head-mounted display;

embedding the first file within the electronic document to create a first enhanced electronic document; and storing the first enhanced electronic document in a document library accessible to the server computer.

2. The computer-implemented method of claim 1, wherein processing content of the electronic document in accordance with a set of rules to identify the plurality of individual content items within the electronic document by recognizing one or more patterns in content of the electronic document comprises:

identifying the electronic document as being a first document type of a plurality of pre-defined document types, wherein each document type is associated with a document structure; and selecting the set of rules used in processing content of the electronic document based on the first document type.

3. The computer-implemented method of claim 2, wherein the first document type is an inspection report and one or more of the content items set forth within the content of the electronic document is an input field for receiving end-user input associated with an observation made by the end-user in completing an inspection.

4. The computer-implemented method of claim 1, further comprising:

generating a second file with a data object for each individual content item identified in the electronic document, wherein each data object includes information indicating a position within the electronic document at which the individual graphical user interface elements associated with the interactive workflow are to be presented when the content of the electronic document is presented by a document viewing application executing at a wearable computing device with a head-mounted display;

embedding the second file within a second instance of the electronic document to create a second enhanced electronic document; and storing the second enhanced electronic document in a document library accessible to the server computer;

wherein elements of the interactive workflow of the second enhanced electronic document are to be presented in a second language, different from a first language for the elements of the interactive workflow of the first enhanced electronic document.

5. The computer-implemented method of claim 1, wherein at least one data object for an individual content item identified in the electronic document is selected for embedding in the electronic document based on a skill level or experience level of an end-user to whom the enhanced electronic document is to be associated and presented.

6. The computer-implemented method of claim 1, further comprising:

presenting the first enhanced electronic document via a user interface of a document editing application, where each data object associated with an individual content item is user-selectable for editing.

7. The computer-implemented method of claim 1, wherein each data object is formatted in JavaScript Object Notation (JSON).

8. A system comprising:

one or more processors;

a memory storage device storing instructions thereon, which, when executed by the one or more processors, cause the system to perform operations comprising:

receiving at a document management service of a server computer an electronic document to be enhanced with an interactive workflow comprising, in part, a plurality of individual graphical user interface elements that correspond with a plurality of individual content items set forth within the content of the electronic document;

with a document processing engine executing at the server computer, processing content of the electronic document in accordance with a set of rules to identify the plurality of individual content items within the electronic document by recognizing one or more patterns in content of the electronic document;

generating a first file with a data object for each individual content item identified in the electronic document, wherein each data object includes information indicating a position within the electronic document at which the individual graphical user interface elements associated with the interactive workflow are to be presented when the content of the electronic document is presented by a document viewing application executing at a wearable computing device with a head-mounted display;

embedding the first file within the electronic document to create a first enhanced electronic document; and storing the first enhanced electronic document in a document library accessible to the server computer.

9. The system of claim 8, wherein processing content of the electronic document in accordance with a set of rules to identify the plurality of individual content items within the electronic document by recognizing one or more patterns in content of the electronic document comprises:

identifying the electronic document as being a first document type of a plurality of pre-defined document types, wherein each document type is associated with a document structure; and selecting the set of rules used in processing content of the electronic document based on the first document type.

10. The system of claim 9, wherein the first document type is an inspection report and one or more of the content items set forth within the content of the electronic document is an input field for receiving end-user input associated with an observation made by the end-user in completing an inspection.

11. The system of claim 8, further comprising:

generating a second file with a data object for each individual content item identified in the electronic document, wherein each data object includes information indicating a position within the electronic document at which the individual graphical user interface elements associated with the interactive workflow are to be presented when the content of the electronic document is presented by a document viewing application executing at a wearable computing device with a head-mounted display;

embedding the second file within a second instance of the electronic document to create a second enhanced electronic document; and storing the second enhanced electronic document in a document library accessible to the server computer;

wherein elements of the interactive workflow of the second enhanced electronic document are to be presented in a second language, different from a first language for the elements of the interactive workflow of the first enhanced electronic document.

12. The system of claim 8, wherein at least one data object for an individual content item identified in the electronic document is selected for embedding in the electronic document based on a skill level or experience level of an end-user to whom the enhanced electronic document is to be associated and presented.

13. The system of claim 8, further comprising:
presenting the first enhanced electronic document via a user interface of a document editing application, where each data object associated with an individual content item is user-selectable for editing.

14. The system of claim 8, wherein each data object is formatted in JavaScript Object Notation (JSON).

15. A system comprising:
means for receiving at a document management service of a server computer an electronic document to be enhanced with an interactive workflow comprising, in part, a plurality of individual graphical user interface elements that correspond with a plurality of individual content items set forth within the content of the electronic document;
with a document processing engine executing at the server computer, means for processing content of the electronic document in accordance with a set of rules to identify the plurality of individual content items within the electronic document by recognizing one or more patterns in content of the electronic document;
means for generating a first file with a data object for each individual content item identified in the electronic document, wherein each data object includes information indicating a position within the electronic document at which the individual graphical user interface elements associated with the interactive workflow are to be presented when the content of the electronic document is presented by a document viewing application executing at a wearable computing device with a head-mounted display;
means for embedding the first file within the electronic document to create a first enhanced electronic document; and
means for storing the first enhanced electronic document in a document library accessible to the server computer.

16. The system of claim 15, wherein processing content of the electronic document in accordance with a set of rules to identify the plurality of individual content items within the electronic document by recognizing one or more patterns in content of the electronic document comprises:
identifying the electronic document as being a first document type of a plurality of pre-defined document types, wherein each document type is associated with a document structure; and
selecting the set of rules used in processing content of the electronic document based on the first document type.

17. The system of claim 16, wherein the first document type is an inspection report and one or more of the content items set forth within the content of the electronic document is an input field for receiving end-user input associated with an observation made by the end-user in completing an inspection.

18. The system of claim 15, further comprising:
means for generating a second file with a data object for each individual content item identified in the electronic document, wherein each data object includes information indicating a position within the electronic document at which the individual graphical user interface elements associated with the interactive workflow are to be presented when the content of the electronic document is presented by a document viewing application executing at a wearable computing device with a head-mounted display;
means for embedding the second file within a second instance of the electronic document to create a second enhanced electronic document; and
means for storing the second enhanced electronic document in a document library accessible to the server computer;
wherein elements of the interactive workflow of the second enhanced electronic document are to be presented in a second language, different from a first language for the elements of the interactive workflow of the first enhanced electronic document.

19. The system of claim 15, wherein at least one data object for an individual content item identified in the electronic document is selected for embedding in the electronic document based on a skill level or experience level of an end-user to whom the enhanced electronic document is to be associated and presented.

20. The system of claim 15, further comprising:
means for presenting the first enhanced electronic document via a user interface of a document editing application, where each data object associated with an individual content item is user-selectable for editing.

* * * * *